US012198631B2

(12) United States Patent
Lee et al.

(10) Patent No.: US 12,198,631 B2
(45) Date of Patent: Jan. 14, 2025

(54) PIXEL CIRCUIT HAVING TWO CAPACITORS AND DISPLAY DEVICE INCLUDING THE SAME

(71) Applicant: LG Display Co., Ltd., Seoul (KR)

(72) Inventors: Yong Won Lee, Paju-si (KR); Ji Soo Yeom, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/475,830

(22) Filed: Sep. 27, 2023

(65) Prior Publication Data

US 2024/0212615 A1 Jun. 27, 2024

(30) Foreign Application Priority Data

Dec. 21, 2022 (KR) ........................ 10-2022-0180065

(51) Int. Cl.
*G09G 3/30* (2006.01)
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/0262* (2013.01); *G09G 2310/08* (2013.01); *G09G 2320/045* (2013.01); *G09G 2330/021* (2013.01); *G09G 2330/06* (2013.01)

(58) Field of Classification Search
CPC ......... G09G 3/3233; G09G 2300/0819; G09G 2300/0852; G09G 2310/0262; G09G 2310/08; G09G 2320/045; G09G 2330/021
See application file for complete search history.

(56) References Cited

U.S. PATENT DOCUMENTS

| | | | | |
|---|---|---|---|---|
| 2011/0084947 A1* | 4/2011 | Chung | G09G 3/3233 345/76 |
| 2019/0266947 A1* | 8/2019 | Zhou | G09G 3/3258 |

FOREIGN PATENT DOCUMENTS

| | | |
|---|---|---|
| KR | 20140071727 A | 6/2014 |
| KR | 20210073188 A | 6/2021 |
| KR | 20210085540 A | 7/2021 |
| KR | 20220057344 A | 5/2022 |

* cited by examiner

*Primary Examiner* — Sanghyuk Park
(74) *Attorney, Agent, or Firm* — Seed IP Law Group LLP

(57) ABSTRACT

Disclosed is a pixel circuit. The pixel circuit includes: a driving element connected to a first node, a second node, and a third node; a first switch element configured to be turned on to supply a data voltage to a fourth node; a second switch element configured to be turned on to supply a reference voltage or an initialization voltage to the fourth node; a third switch element configured to be turned on to connect the first node to the second node; a fourth switch element configured to be turned on to supply the reference voltage to the third node; a fifth switch element configured to be turned on a fourth gate signal to supply a pixel driving voltage to the first node; and a sixth switch element configured to be turned on to connect the third node to a fifth node.

16 Claims, 23 Drawing Sheets

PIXEL CIRCUIT HAVING TWO CAPACITORS AND DISPLAY DEVICE INCLUDING THE SAME

CROSS-REFERENCE TO RELATED APPLICATION

This application claims priority to and the benefit of Korean Patent Application No. 10-2022-0180065, filed Dec. 21, 2022, the disclosure of which is incorporated herein by reference in its entirety.

BACKGROUND

Technical Field

The present disclosure relates to a pixel circuit and a display device including the same.

Description of the Related Art

Electroluminescent display devices are generally classified into inorganic light emitting display devices and organic light emitting display devices according to the materials of light emitting layers. Active matrix type organic light emitting display devices include organic light-emitting diodes (hereinafter referred to as "OLEDs"), which emit light by themselves, and have fast response speeds and advantages in which light emission efficiencies, brightness, and viewing angles are high.

In the organic light-emitting display devices, the OLEDs are formed in pixels. Since the organic light-emitting display devices have fast response speeds and are excellent in light emission efficiency, brightness, and viewing angle as well as being able to exhibit a black gradation in a full black color, the organic light-emitting display devices are excellent in a contrast ratio and color reproducibility.

Pixels of an organic light emitting display (OLED) device include a pixel circuit including a driving element for driving the OLED, and a capacitor connected to the driving element.

Due to process deviations and device characteristic deviations resulting from the manufacturing process of the display panel, there may be differences in the electrical characteristics of the driving element for each pixel. These differences may increase as the driving time of the pixels elapses. In order to compensate for the differences in the electrical characteristics of the driving element for each pixel, an internal compensation circuit may be added to the pixel circuit. The internal compensation circuit may sample a threshold voltage of the driving element and compensate a gate voltage of the driving element by the amount of the threshold voltage of the driving elements.

One version of an internal compensation circuit may be divided into a source follower circuit and a diode connection circuit.

BRIEF SUMMARY

The inventors have realized that while the diode connection circuit may have good compensation performance because the threshold voltage loss of the driving element is small, it may have insufficient sampling time because the threshold voltage of the driving element is sampled at the same time as the data voltage is addressed. They have realized that in the case of the internal compensation circuit using the diode connection circuit, it is difficult to secure the sampling time of the threshold voltage of the driving element because a horizontal period becomes smaller when driving a high-resolution display panel or when driving a display panel at high speed.

The present disclosure provides a pixel circuit that is capable of sufficiently securing a sampling time of a driving element and improving compensation performance of a threshold voltage of the driving element in the pixel circuit including a diode connection circuit, and a display device including the pixel circuit.

The technical benefits and improvements of the present disclosure are not limited to those mentioned above, and other technical benefits and improvements not mentioned will be clearly understood by those skilled in the art from the following description.

A pixel circuit according to one embodiment of the present disclosure includes: a driving element including a first electrode connected to a first node, a gate electrode connected to a second node, and a second electrode connected to a third node; a first capacitor connected between the second node and a fourth node; a second capacitor connected between the third node and the fourth node; a first switch element configured to be turned on in response to a first gate signal to supply a data voltage of pixel data to the fourth node; a second switch element configured to be turned on in response to a second gate signal to supply a reference voltage or an initialization voltage to the fourth node; a third switch element configured to be turned on in response to the second gate signal to electrically connect the first node to the second node; a fourth switch element configured to be turned on in response to a third gate signal to supply the reference voltage to the third node; a fifth switch element configured to be turned on in response to a fourth gate signal to supply a pixel driving voltage to the first node; a sixth switch element configured to be turned on in response to a fifth gate signal to electrically connect the third node to a fifth node; and a light emitting element including an anode electrode connected to the fifth node, and a cathode electrode to which a cathode voltage is applied.

After the threshold voltage of the driving element is stored in the first capacitor, the data voltage may be stored in the second capacitor.

A driving period of the pixel circuit may include a first period, a second period, a third period, a fourth period, and a fifth period. A voltage of the first gate signal may be generated as a pulse of a gate-on voltage synchronized with the data voltage during the third period and may be a gate-off voltage during the first, second, fourth, and fifth periods. A voltage of the second gate signal may be the gate-on voltage during the first and second periods and the gate-off voltage during the third to fifth periods. A voltage of the third gate signal may be the gate-on voltage during the second to fourth periods and the gate-off voltage during the first and fifth periods. A voltage of the fourth gate signal may be the gate-on voltage during the first and fifth periods and the gate-off voltage during the second to fourth periods. A voltage of the fifth gate signal may be the gate-on voltage during the fourth and fifth periods and the gate-off voltage during the first to third periods. The first switch element may be turned on in response to the gate-on voltage of the first gate signal and turned off according to the gate-off voltage of the first gate signal. The second and third switch elements may be turned on in response to the gate-on voltage of the second gate signal and turned off according to the gate-off voltage of the second gate signal. The fourth switch element may be turned on in response to the gate-on voltage of the third gate signal and turned off according to the gate-off voltage of the third gate signal. The fifth switch element may be turned on in response to the gate-on voltage of the fourth gate signal and turned off according to the gate-off voltage of the fourth gate signal. The sixth switch element may be turned on in response to the gate-on voltage of the fifth gate signal and turned off according to the gate-off voltage of the fifth gate signal.

The voltage of the third gate signal may be inverted to the gate-on voltage after a predetermined first delay time elapses after the voltage of the fourth gate signal has been inverted to the gate-off voltage. The voltage of the fourth gate signal may be inverted to the gate-on voltage after a predetermined second delay time elapses after the voltage of the third gate signal has been inverted to the gate-off voltage.

The voltage of the first gate signal may be inverted to the gate-on voltage after a predetermined third delay time elapses after the voltage of the second gate signal has been inverted to the gate-off voltage. The voltage of the fifth gate signal may be inverted to the gate-on voltage after a predetermined fourth delay time elapses after the voltage of the first gate signal has been inverted to the gate-off voltage.

The pixel circuit may further include a seventh switch element configured to be turned on in response to the third gate signal to apply an anode reset voltage to the fifth node.

A display device according to one embodiment of the present disclosure include the pixel circuit.

According to the present disclosure, time for sensing the threshold voltage of the driving element may be sufficiently secured by temporally separating a step of sensing the threshold voltage and a step of writing pixel data to the pixels during the driving period of the pixel circuit including the diode connection circuit, thereby sufficiently securing a threshold voltage sensing period of the driving element when driving a display panel at high resolution and high speed.

According to the present disclosure, by separating the capacitor in which the threshold voltage of the driving element is stored and the capacitor in which the data voltage is stored, it is possible to prevent the error components from being charged to the nodes of the pixel circuit, thereby improving the compensation performance.

According to the present disclosure, the anode reset voltage may be optimized when the driving frequency of the pixels changes as the refresh rate varies by setting the anode reset voltage to be separate from the reference voltage.

According to the present disclosure, it is possible to improve luminance uniformity against luminance fluctuations when the refresh rate varies by setting the initialization voltage that initializes the gate voltage and the reference voltage as independent voltages.

According to the present disclosure, a low power driving may be realized by reducing leakage current and power consumption in the display device including the pixel circuit in which the diode connection circuit is included, and short circuits or electrical interference between the nodes of the pixel circuit may be prevented.

Effects which can be achieved by the present disclosure are not limited to the above-mentioned effects. That is, other objects that are not mentioned may be obviously understood by those skilled in the art to which the present disclosure pertains from the following description.

BRIEF DESCRIPTION OF THE SEVERAL VIEWS OF THE DRAWINGS

The above and other objects, features, and advantages of the present disclosure will become more apparent to those of ordinary skill in the art by describing example embodiments thereof in detail with reference to the attached drawings, in which.

DETAILED DESCRIPTION

Figure 1:
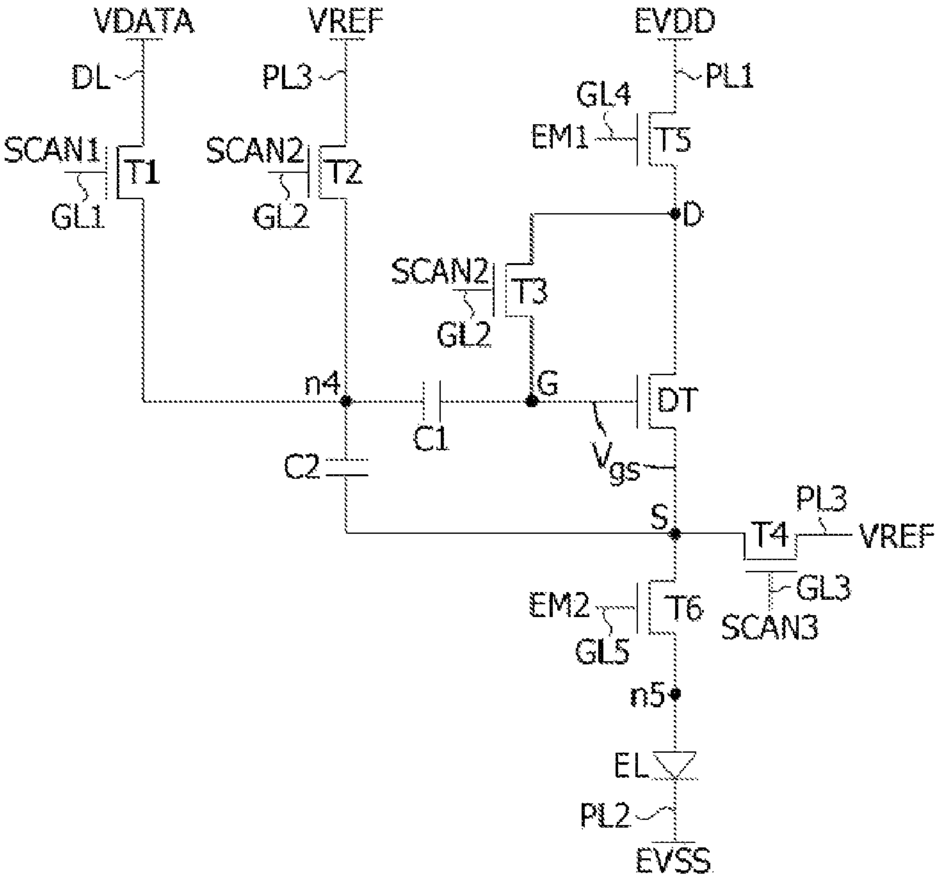
FIG. 1 is a circuit diagram illustrating a pixel circuit according to a first embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “consist of” used herein are generally intended to allow other components to be added unless the terms are used with the term “only.” Any references to singular may include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components may be interposed between them, unless “immediately” or “directly” is used.

When a temporal antecedent relationship is described, such as “after,” “following,” “next to,” “before,” or the like, it may not be continuous on a time base unless “immediately” or “directly” is used.

The terms “first,” “second,” and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Each of the pixels includes a plurality of sub-pixels having different colors for color implementation. The pixel circuit and the gate drive circuit may include a plurality of transistors. Each of the sub-pixels includes a pixel circuit. plurality of transistors used as switch elements or driving elements. The transistor may be implemented as a TFT (Thin Film Transistor). The transistors may be implemented as an oxide thin film transistor (TFT) including an oxide semiconductor, a low temperature poly silicon TFT (LTPS TFT) including a low temperature poly silicon, and the like. Hereinafter, transistors constituting the pixel circuit and the gate driving circuit will be described focusing on an example implemented with an n-channel oxide TFT, but the present disclosure is not limited thereto.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage, and the gate-off voltage may be a gate low voltage.

Hereinafter, various embodiments of the present disclosure will be described in detail with reference to the accompanying drawings.

Figure 2:
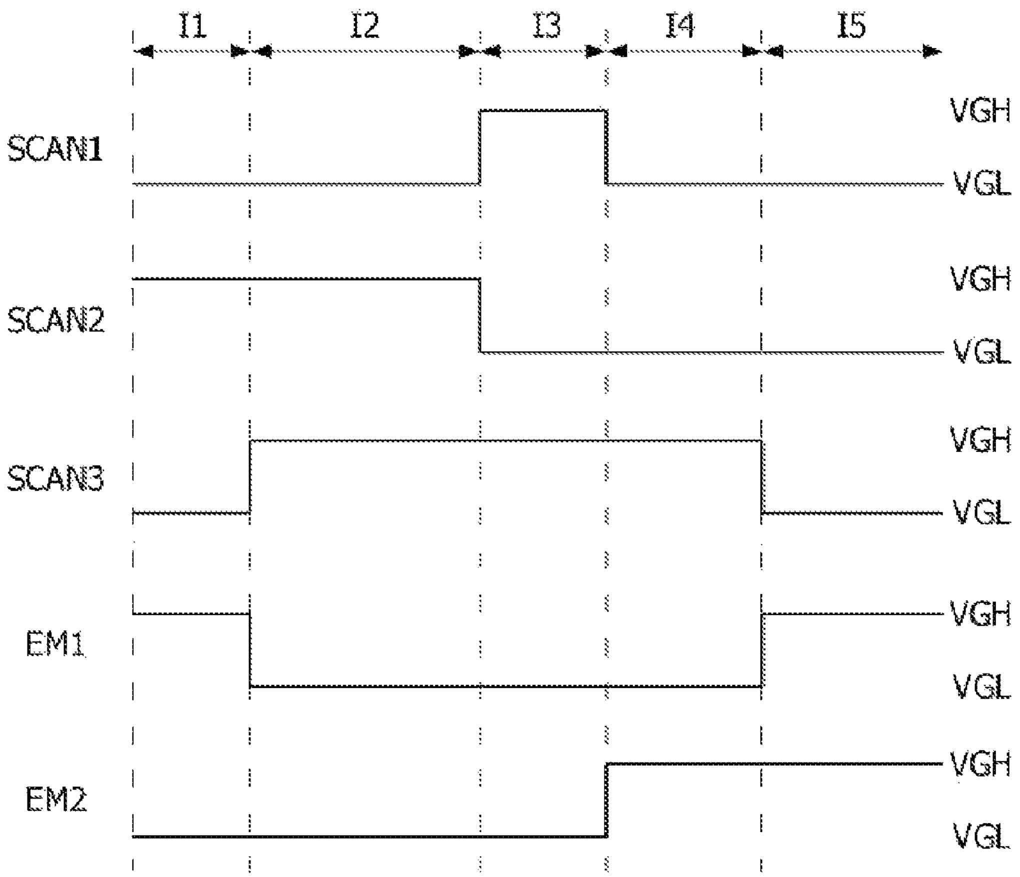
FIGS. 2 and 3 are waveform diagrams illustrating waveforms of gate signals applied to the pixel circuit shown in FIG. 1.
Figure 3:
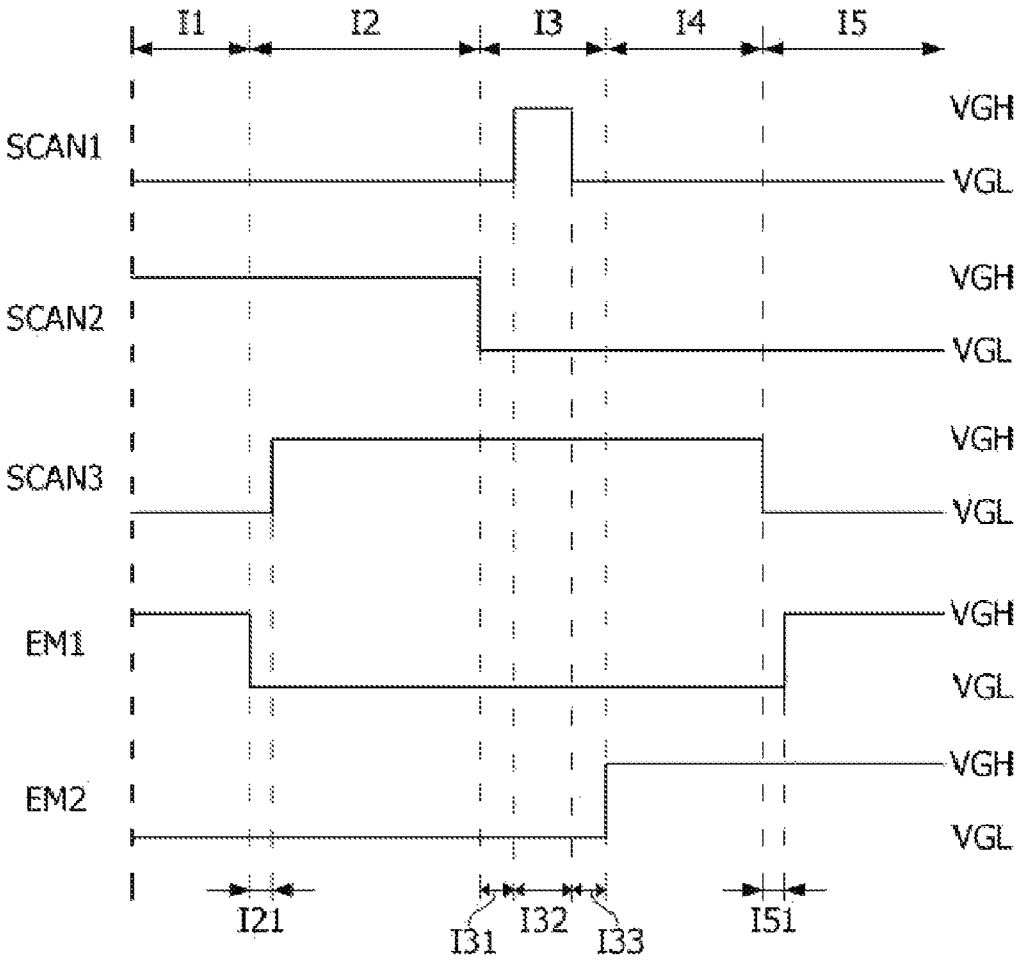

FIG. 1 is a circuit diagram illustrating a pixel circuit according to a first embodiment of the present disclosure. FIGS. 2 and 3 are waveform diagrams illustrating waveforms of gate signals applied to the pixel circuit shown in FIG. 1.

Referring to FIGS. 1 and 3, the pixel circuit includes a light emitting element EL, a driving element DT for driving the light emitting element EL, a plurality of switch elements T1 to T6, a first capacitor C1, and a second capacitor C2. The driving element DT and the switch elements T1 to T6 may be implemented as n-channel oxide TFTs.

The pixel circuit is connected to a data line DL to which a data voltage VDATA is applied, and to gate lines GL1 to GL5 to which gate signals SCAN1, SCAN2, SCAN3, EM1, and EM2 are applied. The pixel circuit is connected to power nodes to which DC voltages (or constant voltages) are applied, such as a first constant voltage node PL1 to which a pixel driving voltage EVDD is applied, a second constant voltage node PL2 to which a cathode voltage EVSS is applied, and a third constant voltage node PL3 to which a reference voltage VREF is applied. On the display panel, power lines to which the constant voltage nodes are connected may be commonly connected to all of pixels.

The pixel driving voltage EVDD is set to a voltage which may be higher than a maximum voltage of the data voltage VDATA and at which the driving element DT may be operated in its saturation region. The reference voltage VREF may be set to a voltage at which the driving element DT may be turned on within a voltage range between the maximum and minimum voltage of the data voltage VDATA. The cathode voltage EVSS is set to a voltage lower than the minimum voltage of the data voltage VDATA. A gate-on voltage VGH may be set to a voltage higher than the pixel driving voltage EVDD, and a gate-off voltage VGL may be set to a voltage lower than the cathode voltage EVSS. For example, the pixel driving voltage EVDD may be set to a voltage selected within a voltage range of 10 [V] to 17 [V], the cathode voltage EVSS may be set to a voltage selected within −8 [V] to −0.5[V], the gate-on voltage VGH may be set to a voltage selected within a voltage range of 15[V] to 22[V], the gate-off voltage VGL may be set to a voltage selected within a voltage range of −20[V] to −5[V], and the reference voltage VREF may be set to a voltage selected within a voltage range of −2[V] to 5[V].

The gate signals SCAN1, SCAN2, SCAN3, EM1, and EM2 include pulses that swing between the gate-on voltage VGH and the gate-off voltage VGL. The gate signals SCAN1, SCAN2, SCAN3, EM1, and EM2 include a first gate signal SCAN1, a second gate signal SCAN2, a third gate signal SCAN3, a fourth gate signal EM1, and a fifth gate signal EM2.

The driving period of the pixel circuit may be divided into first to fifth periods I1 to I5. The first to fifth periods I1 to I5 are determined by the waveforms of the gate signals SCAN1, SCAN2, SCAN3, EM1, and EM2, and are adjustable.

A voltage of the first gate signal SCAN1 is generated as a pulse of the gate-on voltage VGH synchronized with the data voltage VDATA of the pixel data during a third period I3 and is the gate-off voltage VGL during the other periods I1, I2, I4, and I5 except the third period I3. A first switch element T1 is turned on in response to the gate-on voltage VGH of the first gate signal SCAN1.

A voltage of the second gate signal SCAN2 is the gate-on voltage VGH during the first and second periods I1 and I2 and is the gate-off voltage VGL during the third to fifth periods I3, I4, and I5. Second and third switch elements T2 and T3 are turned on in response to the gate-on voltage VGH of the second gate signal SCAN2.

A voltage of the third gate signal SCAN3 is the gate-on voltage VGH during the second to fourth periods I1 to I4 and is the gate-off voltage VGL during the first and fifth periods I1 and I5. A fourth switch element T4 is turned on in response to the gate-on voltage VGH of the third gate signal SCAN3.

A voltage of the fourth gate signal EM1 is the gate-on voltage VGH during the first and fifth periods I1 and I5 and is the gate-off voltage VGL during the second to fourth periods I2 to I4. A fifth switch element T5 is turned on in response to the gate-on voltage VGH of the fourth gate signal EM1.

A voltage of the fifth gate signal EM2 is the gate-on voltage VGH during the fourth and fifth periods I4 and I5 and is the gate-off voltage VGL during the first to third periods I1, I2, and I3. A sixth switch element T6 is turned on in response to the gate-on voltage VGH of the fifth gate signal EM2.

The driving element DT generates a current according to a gate-source voltage Vgs to drive the light emitting element EL. The driving element DT includes a first electrode connected to a first node D, a gate electrode connected to a second node G, and a second electrode connected to a third node S.

The light emitting element EL may be implemented as an OLED. The light emitting element EL includes an anode electrode, a cathode electrode, and an organic compound layer formed between the electrodes. The anode electrode of the light emitting element EL is connected to a fifth node n5, and the cathode electrode is connected to the second constant voltage node PL2 to which the cathode voltage EVSS is applied. The organic compound layer may include, but is not limited to, a hole injection layer HIL, a hole transport layer HTL, a light emission layer EML, an electron transport layer ETL, and an electron injection layer EIL. When a voltage is applied to the anode and cathode electrodes of the light emitting element EL, holes passing through the hole transport layer HTL and electrons passing through the electron transport layer ETL move to the emission layer EML to form excitons. In this case, visible light is emitted from the light emission layer EML. The light emitting element EL may be implemented as a tandem structure with a plurality of light emitting layers stacked on top of each other. The light emitting element EL having the tandem structure may improve the luminance and lifespan of pixels.

After a threshold voltage Vth of the driving element DT is stored in the first capacitor C1, the data voltage VDATA of the pixel data is stored in the second capacitor C2. The first capacitor C1 is connected between the second node G and the fourth node n4 to store therein the threshold voltage Vth of the driving element DT during the second period I2. The second capacitor C2 is connected between the third node S and the fourth node n4 to store therein the data voltage VDATA of the pixel data during the third period I3. The driving element DT is driven by the gate-source voltage Vgs stored in the first and second capacitors C1 and C2 connected in series during the fifth period I5 to generate a current that drives the light emitting element EL. The first and second capacitors C1 and C2 may be designed to have the same capacitance, but they are not limited to the same capacitance.

The first switch element T1 is turned on in response to a pulse of the first gate signal SCAN1 generated as the gate-on voltage VGH during the third period I3. When the first switch element T1 is turned on, the data voltage VDATA of the pixel data is applied to the fourth node n4. The first switch element T1 is turned off during the periods I1, I2, I4, and I5 other than the third period I3. The first switch element T1 includes a first electrode connected to the data line DL to which the data voltage VDATA is applied, a gate electrode connected to a first gate line GL1 to which the first gate signal SCAN1 is applied, and a second electrode connected to the fourth node n4.

The second switch element T2 is turned on in response to the gate-on voltage VGH of the second gate signal SCAN2 during the first and second periods I1 and I2. When the second switch element T2 is turned on, the reference voltage VREF is applied to the fourth node n4. The second switch element T2 is turned off during the third to fifth periods I3 to I5. The second switch element T2 includes a first electrode connected to the third constant voltage node PL3 to which the reference voltage VREF is applied, a gate electrode connected to a second gate line GL2 to which the second gate signal SCAN2 is applied, and a second electrode connected to the fourth node n4.

The third switch element T3 is turned on in response to the gate-on voltage VGH of the second gate signal SCAN2 during the first and second periods I1 and I2. When the third switch element T3 is turned on, the first node D is electrically connected to the second node G, so that the driving element DT is driven as a diode. The third switch element T3 is turned off during the third to fifth period I3 to I5. The third switch element T3 includes a first electrode connected to the first node D, a gate electrode connected to the second gate line GL2 to which the second gate signal SCAN2 is applied, and a second electrode connected to the second node n2.

The fourth switch element T4 is turned on in response to the gate-on voltage VGH of the third gate signal SCAN3 during the second to fourth periods I2, I3, and I4. When the fourth switch element T4 is turned on, the reference voltage VREF is applied to the third node S. The fourth switch element T4 is turned off during the first and fifth periods I1 and I5. The fourth switch element T4 includes a first electrode connected to the third node S, a gate electrode connected to the third gate line GL3 to which the third gate signal SCAN3 is applied, and a second electrode connected to the third constant voltage node PL3 to which the reference voltage VREF is applied.

The fifth switch element T5 is turned on in response to the fourth gate signal EM1, which is generated as a gate-on voltage VGH during the first and fifth periods I1 and I5. When the fifth switch element T5 is turned on, the pixel driving voltage EVDD is applied to the first electrode of the driving element DT. The fifth switch element T5 is turned off during the second to fourth periods I2, I3, and I4. The fifth switch element T5 includes a first electrode connected to the first constant voltage node PL1 to which the pixel driving voltage EVDD is applied, a gate electrode connected to a fourth gate line GL4 to which the fourth gate signal EM1 is applied, and a second electrode connected to the first node D.

The sixth switch element T6 is turned on in response to the fifth gate signal EM2, which is generated as a gate-on voltage VGH during the fourth and fifth periods I4 and I5. When the sixth switch element T6 is turned on, the third node S is electrically connected to the anode electrode of the light emitting element EL. The sixth switch element T6 is turned off during the first to third periods I1, I2, and I3. The sixth switch element T6 includes a first electrode connected to the third node S, a gate electrode connected to a fifth gate line GL5 to which the fifth gate signal EM2 is applied, and a second electrode connected to the fifth node n5.

When a short circuit occurs between the power nodes during the phase transition of an internal compensation circuit, power may be consumed due to leakage current and the voltage of the nodes may be changed. For example, the leakage current may occur when the ON sections of the fourth and fifth switch elements T4 and T5 overlap. To prevent this, the waveforms of the gate signals SCAN1, SCAN2, SCAN3, EM1, and EM2 may be changed as shown in FIG. 3.

Referring to FIG. 3, a delay time I21 may be set between the ON sections of the third and fourth gate signals SCAN3 and EM1 to prevent the fourth and fifth switch elements T4 and T5 from being switched simultaneously between the first period I1 and the second period I2. The voltage of the third gate signal SCAN3 may be inverted to the gate-on voltage VGH between the first period I1 and the second period I2 after the first delay time I21 after the voltage of the fourth gate signal EM1 has been inverted to the gate-off voltage VGL. The voltage of the third gate signal SCAN3 may be inverted to the gate off voltage VGL at the end of the fourth period I4. The voltage of the fourth gate signal EM1 may be inverted to the gate off voltage VGL at the end of the first period I1 and then inverted to the gate on voltage VGH after a second delay time I51 from the end of the fourth period I4.

During the third period I3 during which the pixel data is written (or addressed) to the pixels in a pixel line, a pulse width of the first gate signal SCAN1 may be adjusted to prevent interference between the nodes. After the voltage of the second gate signal SCAN2 is inverted to the gate-off voltage VGL and then a third delay time I31 elapse, the voltage of the first gate signal SCAN1 may be inverted to the gate-on voltage VGH. The voltage of the first gate signal SCAN1 is maintained at the gate-on voltage VGH during a pulse width section I32 of the first gate signal SCAN1. After the voltage of the first gate signal SCAN1 is inverted to the gate-off voltage VGL and then a fourth delay time I33 elapse, a voltage of the fifth gate signal EM2 may be inverted to the gate-on voltage VGH.

FIGS. 4A to 8B are diagrams illustrating a driving period of the pixel circuit shown in FIG. 1 in steps.

Figure 4A:
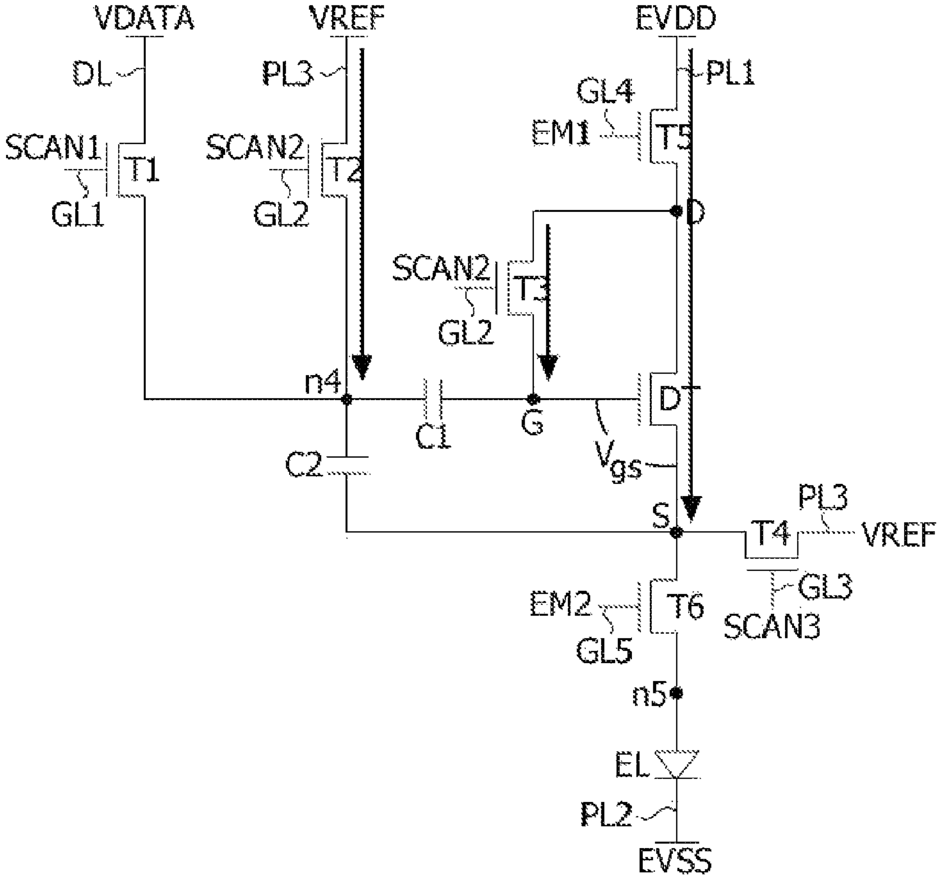
FIGS. 4A to 8B are diagrams illustrating a driving period of the pixel circuit shown in FIG. 1 in steps.

FIG. 4A is a circuit diagram illustrating a current flowing through the pixel circuit during the first period I1.

Figure 4B:
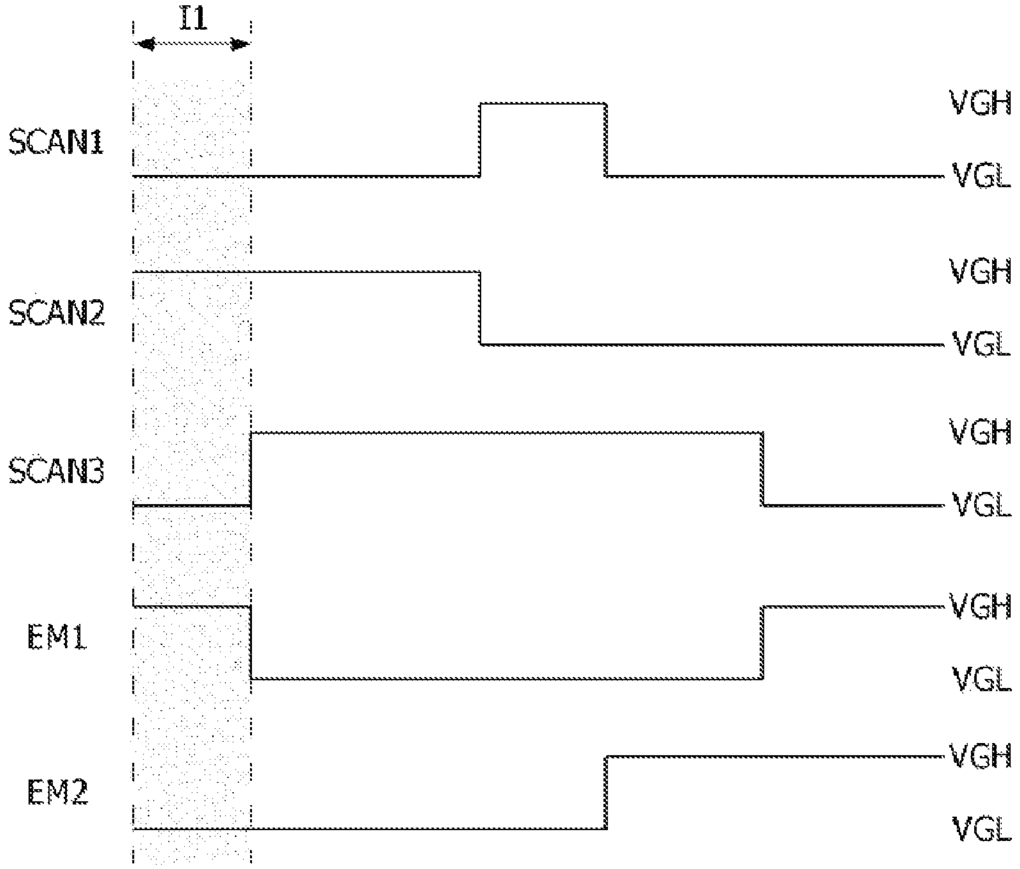

Referring to FIGS. 4A and 4B, during the first period I1, the nodes of the pixel circuit are initialized. During the first period I1, the voltage of the second and fourth gate signals SCAN2 and EM1 is the gate-on voltage VGH. During the first period I1, the voltages of the first, third, and fifth gate signals SCAN1, SCAN3, and EM2 are gate-off voltages VGL. Therefore, during the first period I1, the second, third, and fifth switch elements T2, T3, and T5 are turned on, and the first, fourth, and sixth switch elements T1, T4, and T6 are turned off. During the first period I1, the pixel driving voltage EVDD is applied to the second node G to turn on the driving element DT. At this time, the voltage of the third node S is EVDD−Vth, and the voltage of the fourth node n4 is VREF. 'Vth' is the threshold voltage of the driving element DT. At the end of the first period I1, the voltage of the first capacitor C1 is EVDD−VREF, and the voltage of the second capacitor C2 is EVDD−Vth−VREF. Note that the threshold voltages and turn on characteristics of the switching transistors T2, T5, and T3 are omitted in the illustration of the voltages of the capacitors C1, C2 since they are small in comparison to the circuit operations. In the description herein, the threshold voltages of the switching transistors T1, T2, T3, T4, T5, and T6 are all omitted in the illustration the operations of the circuit, which does not affect the understanding of the disclosure. At the end of the first period I1, the gate-source voltage Vgs of the driving element DT is the threshold voltage Vth of the driving element DT.

Figure 5A:
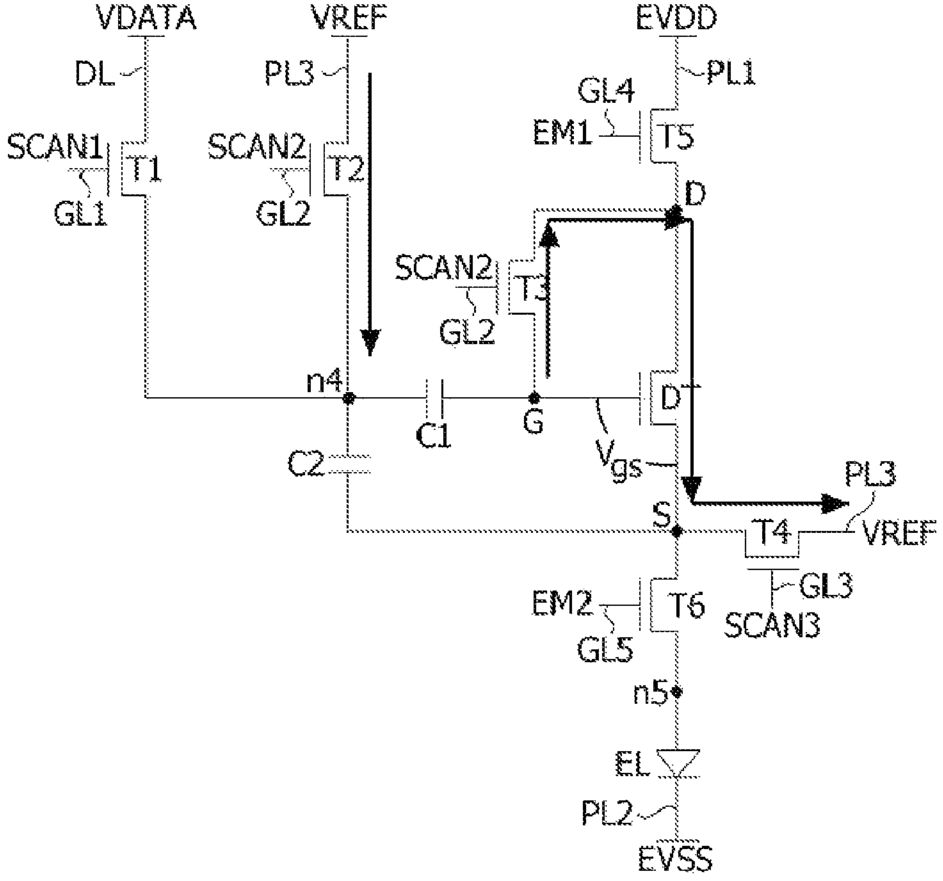

FIG. 5A is a circuit diagram illustrating a current flowing through the pixel circuit during the second period I2.

Figure 5B:
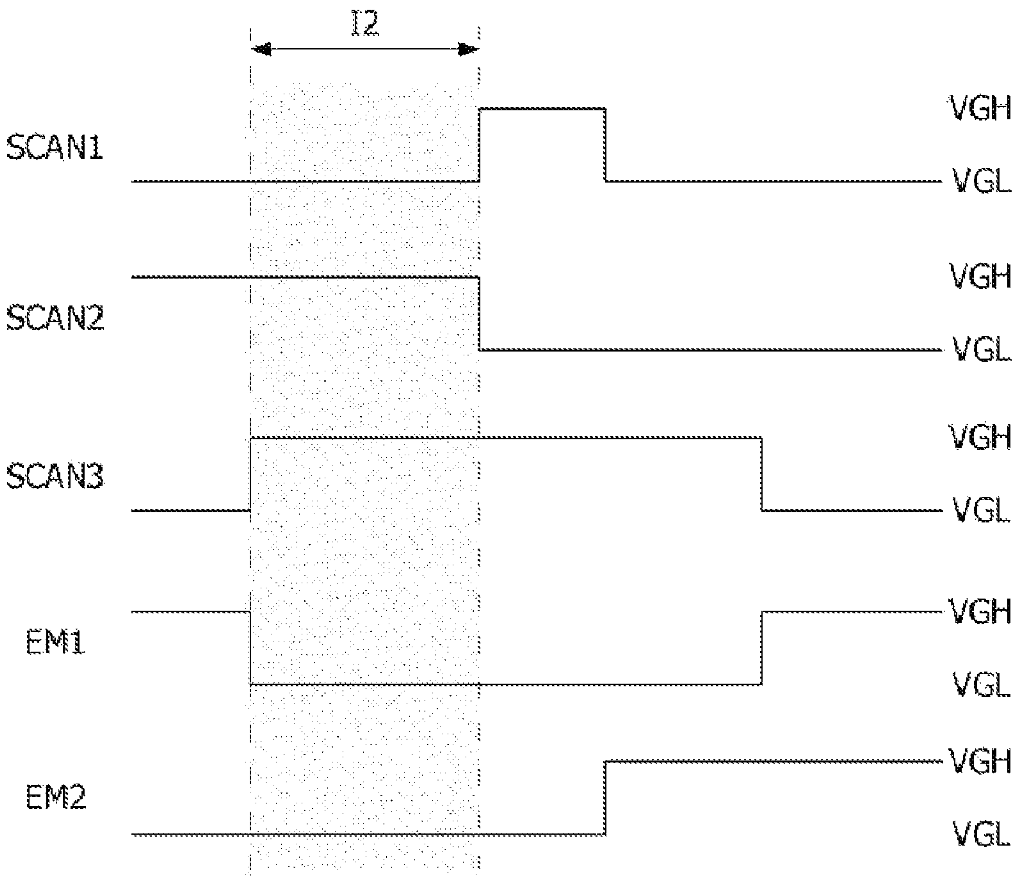

Referring to FIGS. 5A and 5B, during the second period I2, the threshold voltage Vth of the driving element DT is stored in the first capacitor C1. During the second period I2, the voltage of the second and third gate signals SCAN2 and SCAN3 is the gate-on voltage VGH. During the second period I2, the voltage of the first, fourth, and fifth gate signals SCAN1, EM1, and EM2 is the gate off voltage VGL. During the second period I2, the second, third, and fourth switch elements T2, T3, T4, and the driving element DT are turned on, and the first, fifth, and sixth switch elements T1, T5, and T6 are turned off. At the end of the second period I2, the voltage of the third node S is VREF and the voltage of the second node G is VREF−Vth. At the end of the second period I2, the driving element DT is turned off, the voltage of the first capacitor C1 is Vth, and the voltage of the second capacitor C2 is zero.

Figure 6A:
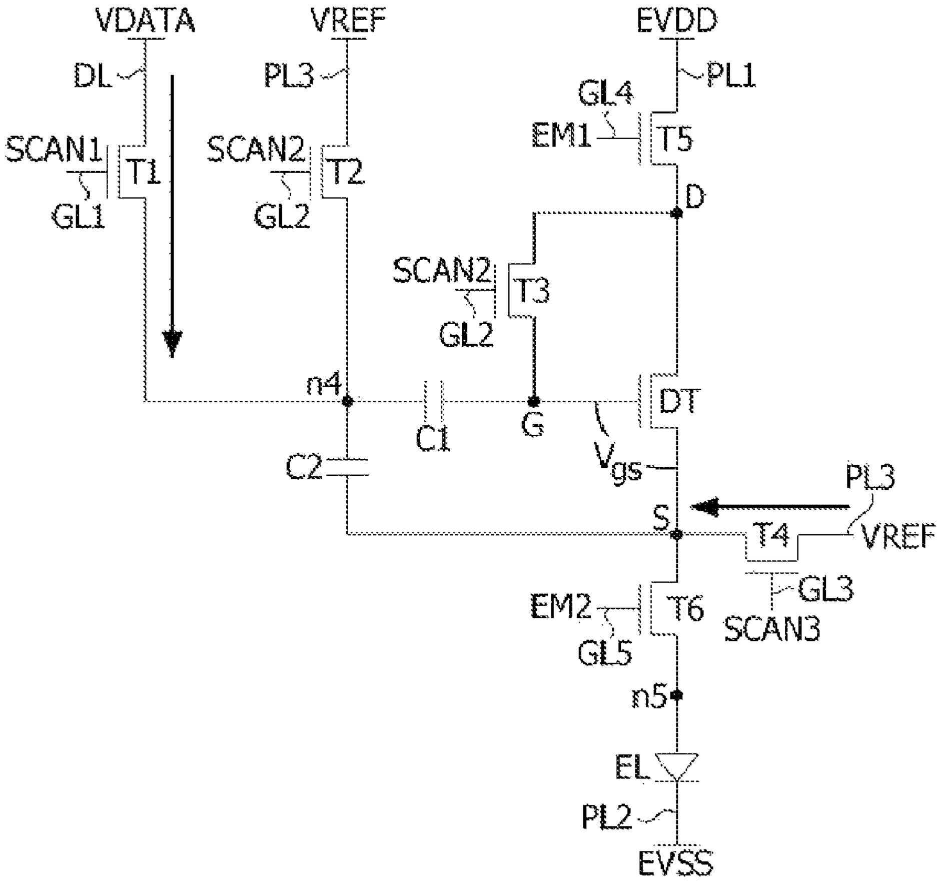

FIG. 6A is a circuit diagram illustrating a current flowing through the pixel circuit during the third period I3.

Figure 6B:
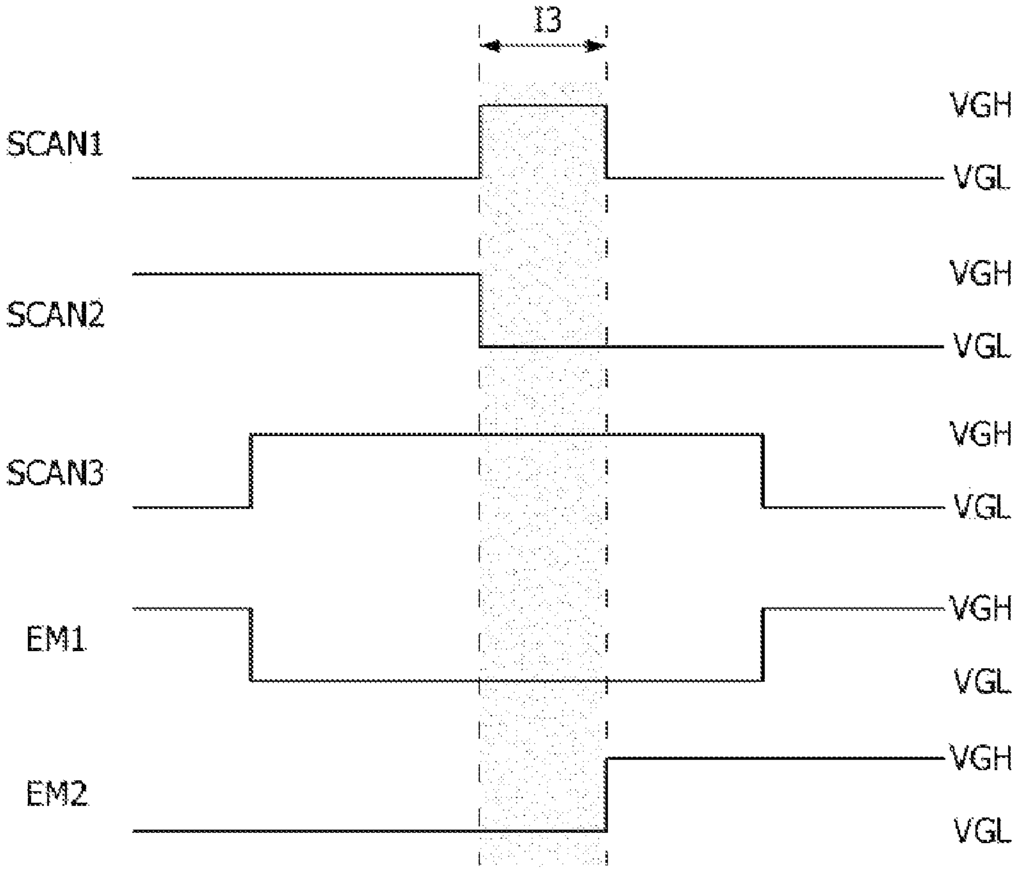

Referring to FIGS. 6A and 6B, during the third period I3, the data voltage VDATA of the pixel data is stored in the second capacitor C2. During the third period I3, the voltage of the first and third gate signals SCAN1 and SCAN3 is the gate-on voltage VGH, and the voltage of the second, fourth, and fifth gate signals SCAN2, EM1, and EM2 is the gate-off voltage VGL. During the third period I3, the first and fourth switch elements T1 and T4 are turned on, and the second, third, fifth, and sixth switch elements T2, T3, T5, and T6 are turned off. During the third period I3, the data voltage VDATA is applied to the node n4 and the reference voltage VREF is applied to the node S. Therefore, at the end of the third period I3, the voltage of the second node G is VDATA−Vth and the voltage of the third node S is VREF. At the end of the third period I3, the voltage of the second capacitor C2 is VDATA−VREF, and the voltage of the first capacitor C1 is Vth. At the end of the third period I3, the gate-source voltage Vgs of the driving element DT is VDATA−VREF+Vth.

A frame frequency of an input image may be reduced to a frequency of a low-speed driving mode condition. In the low-speed drive mode, the voltage of the third node S may be discharged, thereby changing the gate-source voltage of the driving element DT. The reference voltage VREF is supplied to the third node S in the third period I3 to suppress the variation of the gate-source voltage Vgs of the driving element DT and initialize the anode electrode of the light emitting element EL to the reference voltage VREF.

Figure 7A:
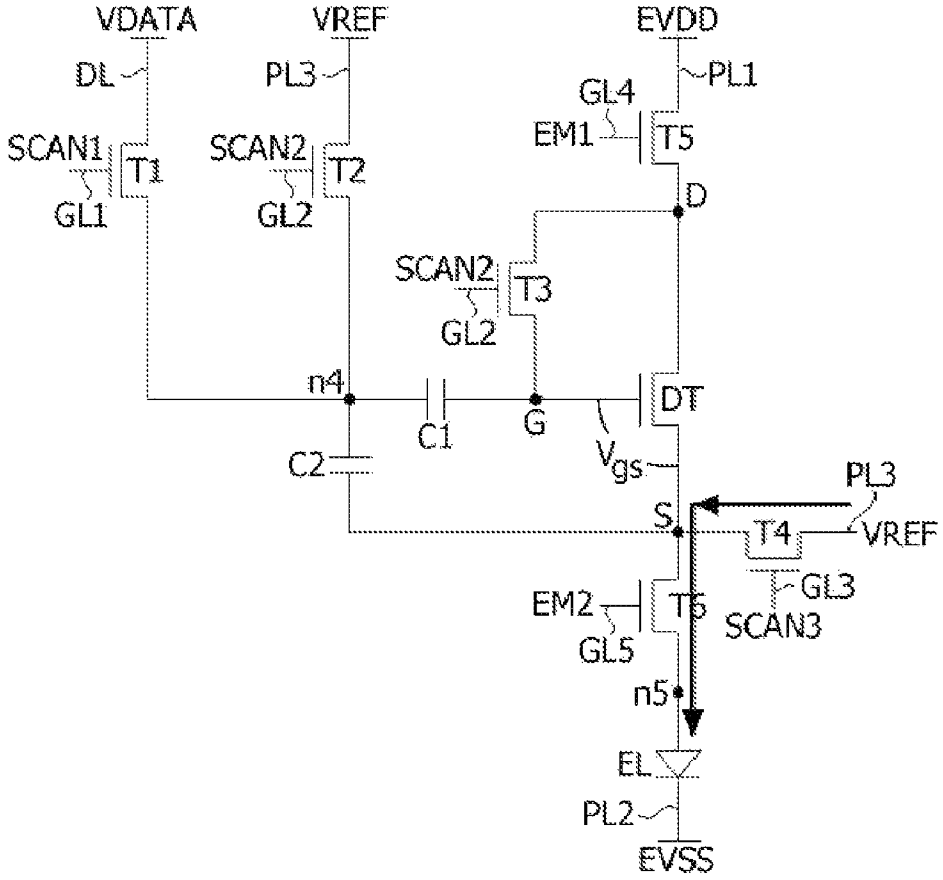

FIG. 7A is a circuit diagram illustrating a current flowing through the pixel circuit during the fourth period I4.

Figure 7B:
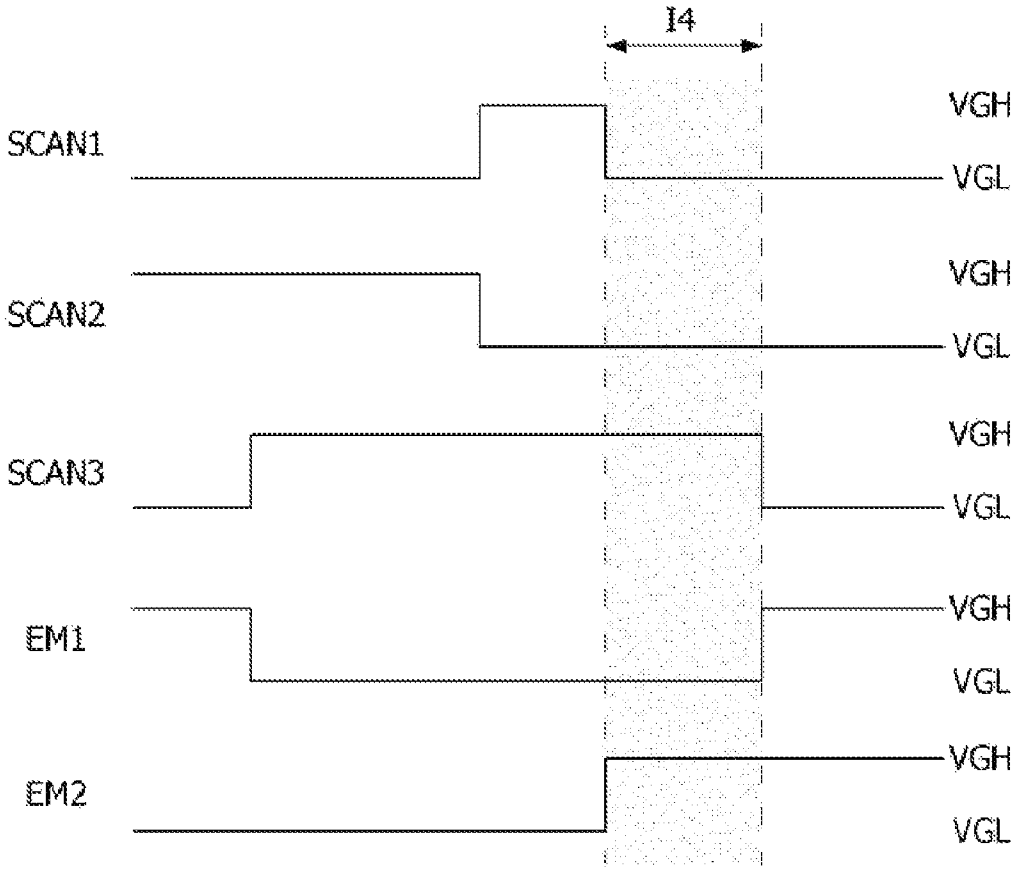

Referring to FIG. 7A and FIG. 7B, during the fourth period I4, the voltage of the third and fifth gate signals SCAN3 and EM2 is the gate-on voltage VGH and the voltage of the first, second, and fourth gate signals SCAN1, SCAN2, and EM1 is the gate-off voltage VGL. During the fourth period I4, the fourth and sixth switch elements T4 and T6 are turned on, and the first, second, third, and fifth switch elements T1, T2, T3, and T5 are turned off. During the fourth period I4, the reference voltage VREF is applied to the third node S and the anode electrode of the light emitting element EL. At this time, since the second node G and the fourth node n4 are floating, the gate-source voltage of the driving element DT is maintained at VDATA−VREF+Vth, and the voltage of the capacitors C1 and C2 is also maintained. At the end of the fourth period I4, the voltage of the second node G is VDATA−Vth and the voltage of the third node S is VREF.

Figure 8A:
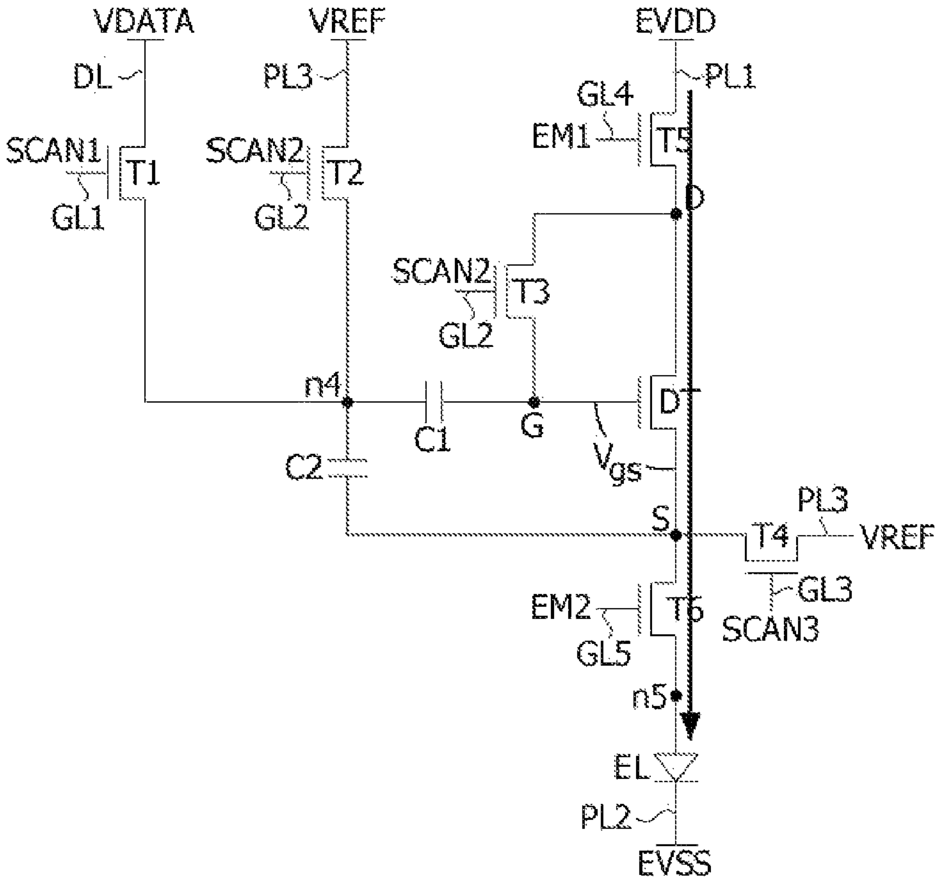

FIG. 8A is a circuit diagram illustrating a current flowing through the pixel circuit during the fifth period I5.

Figure 8B:
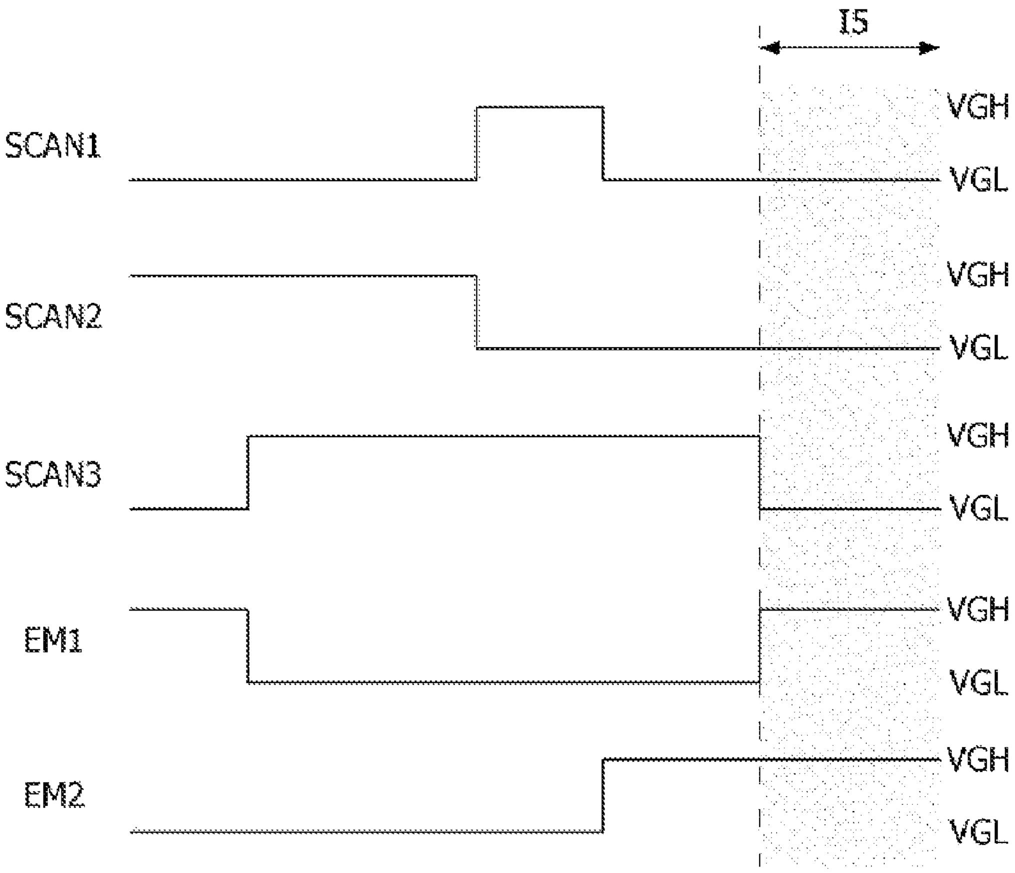

Referring to FIGS. 8A and 8B, during the fifth period I5, the driving element DT generates a current according to the gate-source voltage Vgs to drive the light emitting element EL. The light emitting element EL may be emitted at a luminance corresponding to a grayscale value of the pixel data by the current flowing through the driving element DT. During the fifth period i5, the voltage of the fourth and fifth gate signals EM1 and EM2 is the gate-on voltage VGH, and the voltage of the other gate signals SCAN1, SCAN2, and SCAN3 is the gate-off voltage VGL. During the fifth period i5, the fifth and sixth switch elements T5 and T6 are turned on, and the first to fourth switch elements T1 to T4 are turned off. The driving element DT is turned on.

Figure 9:
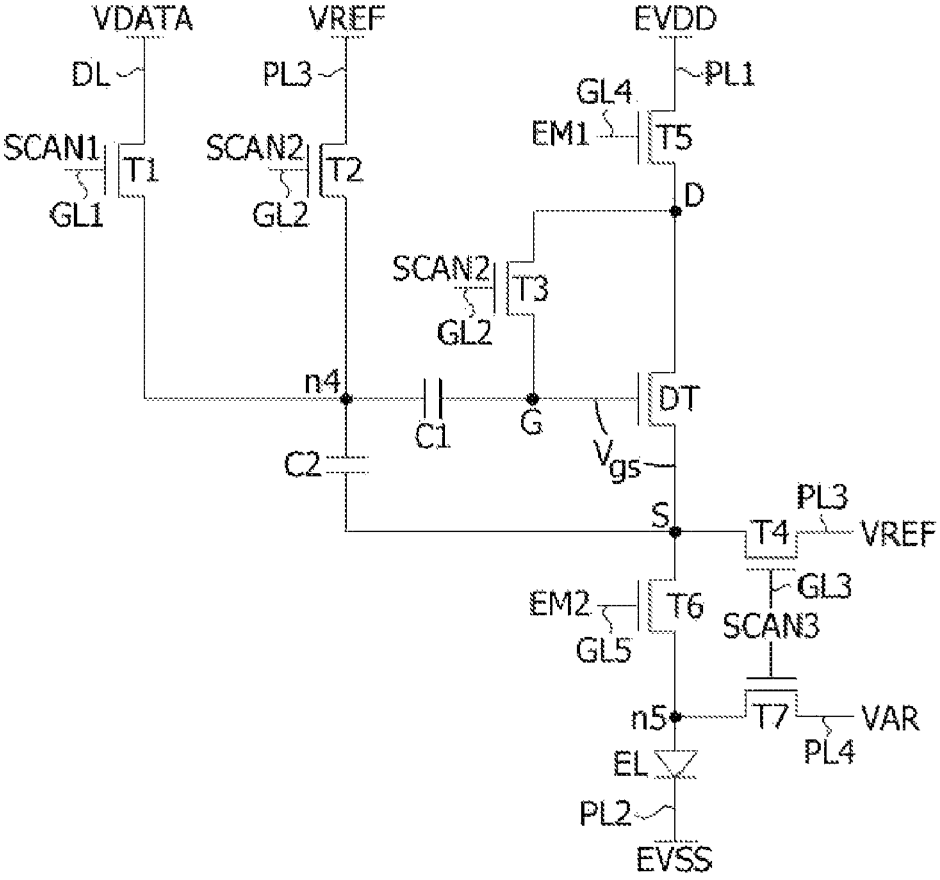
FIG. 9 is a circuit diagram illustrating a pixel circuit according to a second embodiment of the present disclosure.
Figure 10:
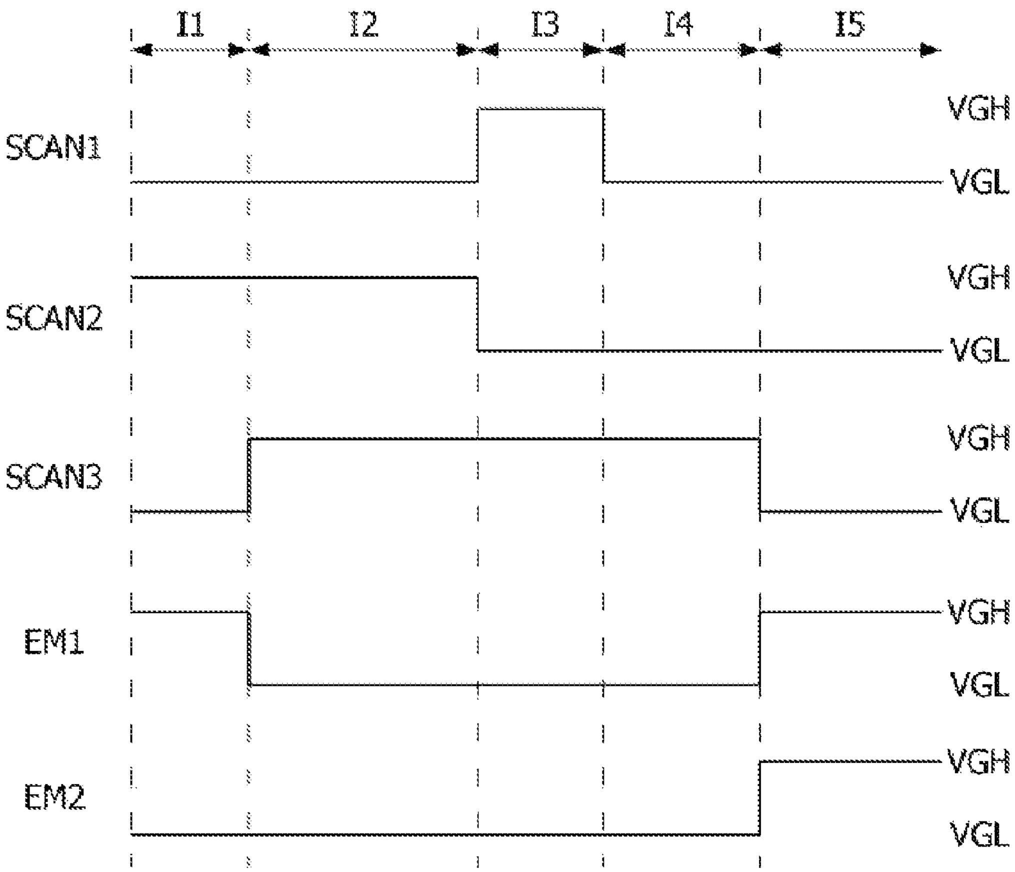
FIGS. 10 and 11 are waveform diagrams illustrating waveforms of gate signals applied to the pixel circuit shown in FIG. 9.
Figure 11:
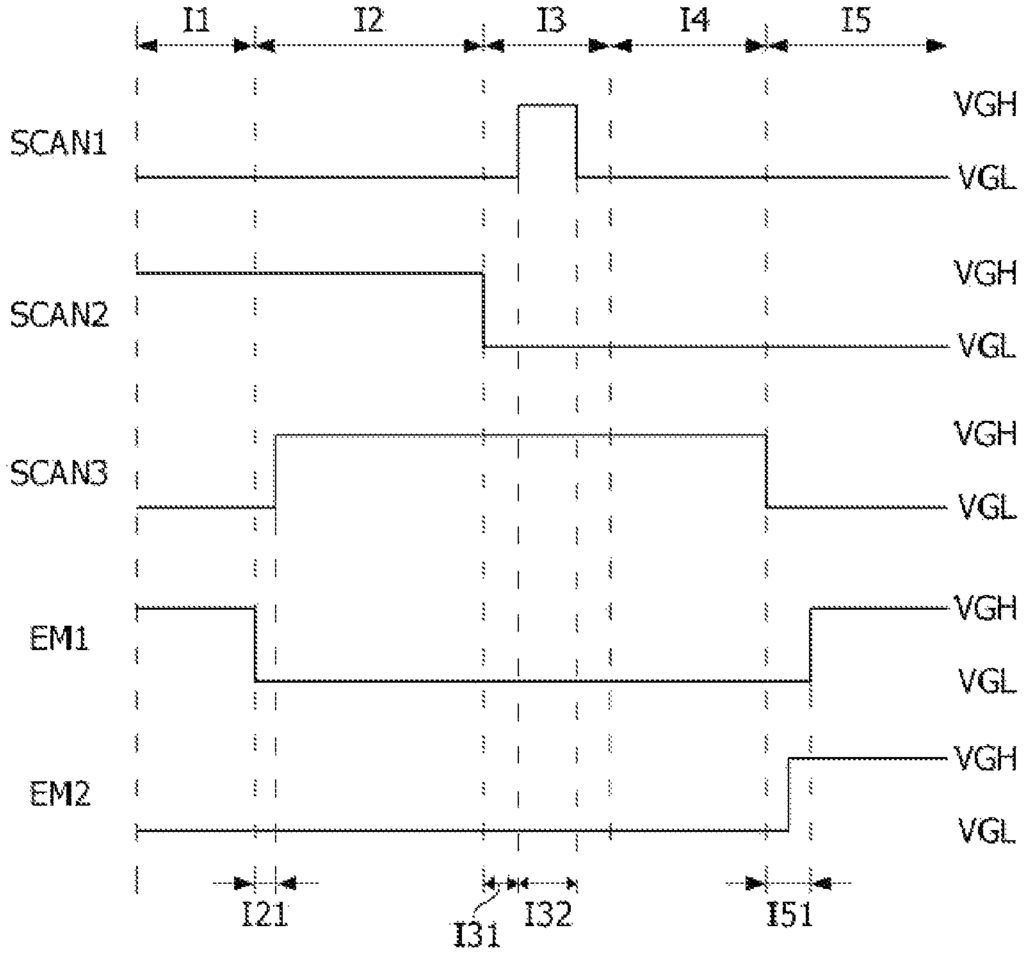

FIG. 9 is a circuit diagram illustrating a pixel circuit according to a second embodiment of the present disclosure. FIGS. 10 and 11 are waveform diagrams showing waveforms of the gate signals applied to the pixel circuit shown in FIG. 9.

In the case of the pixel circuit shown in FIG. 9, an anode reset voltage VAR may be set to a voltage independent of the reference voltage VREF in order to reduce the difference in the luminance that occurs when the driving frequency of pixels is varied, for example, when the pixel circuit is driven in the low-speed driving mode and at a high-speed driving mode. The anode reset voltage VAR may be set to a voltage level different from the reference voltage VREF, and the voltage level may be varied according to a hold time during which the pixel circuit maintains the previous data voltage without writing the data voltage thereto in the low-speed driving mode.

Referring to FIGS. 9-11, the pixel circuit includes a light emitting element EL, a driving element DT for driving the light emitting element EL, a plurality of switch elements T1 to T7, a first capacitor C1, and a second capacitor C2. The driving element DT and the switch elements T1 to T7 may be implemented as n-channel oxide TFTs.

This embodiment may optimize the anode reset voltage VAR in the low-speed driving mode by adding a seventh switch element T7 that switches a separate anode reset voltage VAR of the pixel circuit. The anode reset voltage VAR may be set to a voltage higher than the cathode voltage EVSS and may be variable. In this embodiment, the components that are substantially the same as those of the first embodiment described above are designated by the same reference numerals, and a detailed description thereof is omitted.

The gate signals SCAN1, SCAN2, SCAN3, EM1, and EM2 include pulses that swing between the gate-on voltage VGH and the gate-off voltage VGL. The gate signals SCAN1, SCAN2, SCAN3, EM1, and EM2 include a first gate signal SCAN1, a second gate signal SCAN2, a third gate signal SCAN3, a fourth gate signal EM1, and a fifth gate signal EM2.

The driving period of the pixel circuit may be divided into first to fifth periods I1 to I5. The first to fifth periods I1 to I5 are determined by the waveforms of the gate signals SCAN1, SCAN2, SCAN3, EM1, and EM2, and are adjustable.

A voltage of the first gate signal SCAN1 is generated as a pulse of the gate-on voltage VGH synchronized with the data voltage VDATA of the pixel data during a third period I3 and is the gate-off voltage VGL during the other periods I1, I2, I4, and I5 except the third period I3. A first switch element T1 is turned on in response to the gate-on voltage VGH of the first gate signal SCAN1.

A voltage of the second gate signal SCAN2 is the gate-on voltage VGH during the first and second periods I1 and I2 and is the gate-off voltage VGL during the third to fifth periods I3, I4, and I5. Second and third switch elements T2 and T3 are turned on in response to the gate-on voltage VGH of the second gate signal SCAN2.

A voltage of the third gate signal SCAN3 is the gate-on voltage VGH during the second to fourth periods I1 to I4 and is the gate-off voltage VGL during the first and fifth periods I1 and I5. A fourth and seventh switch elements T4 and T7 are turned on in response to the gate-on voltage VGH of the third gate signal SCAN3.

A voltage of the fourth gate signal EM1 is the gate-on voltage VGH during the first and fifth periods I1 and I5 and is the gate-off voltage VGL during the second to fourth periods I2 to I4. A fifth switch element T5 is turned on in response to the gate-on voltage VGH of the fourth gate signal EM1.

A voltage of the fifth gate signal EM2 is the gate-on voltage VGH during the fifth period i5 and the gate-off voltage VGL during the first to fourth periods I1 to I4. A sixth switch element T6 is turned on in response to the gate-on voltage VGH of the fifth gate signal EM2.

When a short circuit occurs between the power nodes during the phase transition of an internal compensation circuit, power may be consumed due to leakage current and the voltage of the nodes may be changed. For example, leakage current may occur when the ON sections of the fourth and fifth switch elements T4 and T5 overlap and when the ON sections of the fifth and sixth switch elements T5 and T6 overlap. To prevent this, the waveforms of the gate signals SCAN1, SCAN2, SCAN3, EM1, and EM2 may be changed as shown in FIG. 11.

Referring to FIG. 11, a delay time I21 may be set between the ON sections of the third and fourth gate signals SCAN3 and EM1 to prevent the fourth and fifth switch elements T4 and T5 from being switched simultaneously between the first period I1 and the second period I2. The voltage of the third gate signal SCAN3 may be inverted to the gate on voltage VGH after the first delay time I21 after the voltage of the fourth gate signal EM1 has been inverted to the gate off voltage VGL between the first period I1 and the second period I2, and then may be inverted to the gate off voltage VGL at the end of the fourth period I4. The voltage of the fourth gate signal EM1 may be inverted to the gate off voltage VGL at the end of the first period I1 and then inverted to the gate on voltage VGH after a second delay time I51 from the end of the fourth period I4. The voltage of the fifth gate signal EM2 may be inverted to the gate-on voltage VGH between a falling edge of the third gate signal SCAN3 and a rising edge of the fourth gate signal EM1 within the second delay time I51.

The voltage of the first gate signal SCAN1 may be inverted to the gate-on voltage VGH after a third delay time I31 from the end of the second period I2. Within the second period I2, the voltage of the first gate signal SCAN1 may be maintained at the gate-on voltage VGH during a pulse width section I32 of the first gate signal SCAN1.

The fourth and seventh switch elements T4 and T7 are turned on in response to the gate-on voltage VGH of the third gate signal SCAN3 during the second to fourth periods I2, I3, and I4.

The fourth switch element T4 includes a first electrode connected to the third node S, a gate electrode to which the third gate signal SCAN3 is applied, and a second electrode to which the reference voltage VREF is applied. The seventh switch element T7 includes a first electrode connected to the fifth node n5, a gate electrode to which the third gate signal SCAN3 is applied, and a second electrode to which the anode reset voltage VAR is applied. The anode reset voltage VAR may be commonly applied to the pixels via a separate power line PL4 that is electrically isolated from the third constant voltage node PL3.

During the first period I1, the current flowing through the pixel circuit illustrated in FIG. 9 is substantially the same as in FIG. 4A.

Figure 12:
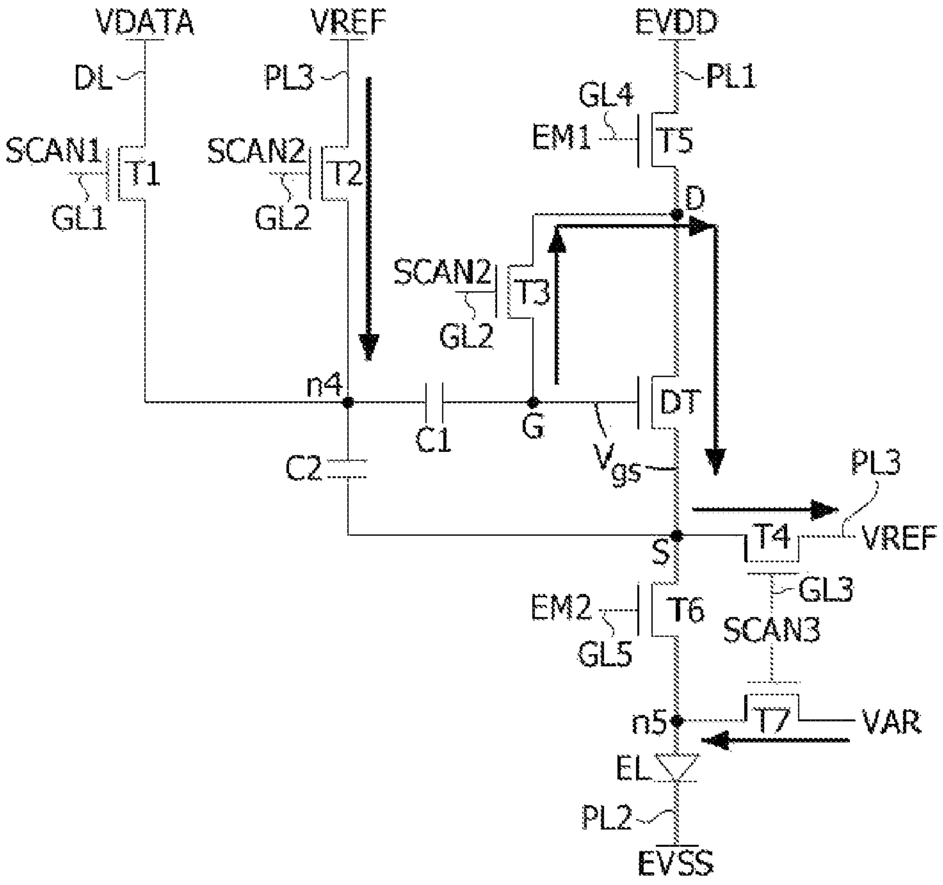
FIGS. 12 to 14 are diagrams illustrating a current flowing through the pixel circuit shown in FIG. 9 during periods 2 to 4.

FIG. 12 is a circuit diagram illustrating a current flowing through the pixel circuit shown in FIG. 9 during the second period I2.

Referring to FIGS. 10 to 12, during the second period I2, the threshold voltage Vth of a driving element DT is stored in the first capacitor C1. During the second period I2, the voltage of the second and third gate signals SCAN2 and SCAN3 is the gate-on voltage VGH. During the second period I2, the voltage of the first, fourth, and fifth gate signals SCAN1, EM1, and EM2 is the gate off voltage VGL. During the second period I2, the second, third, fourth, and seventh switch elements T2, T3, T4, and T7 and the driving element DT are turned on, and the first, fifth, and sixth switch elements T1, T5, and T6 are turned off. At the end of the second period I2, the voltage of the third node S is VREF and the voltage of the second node G is VREF−Vth. At the end of the second period I2, the anode voltage of the light emitting element EL is the anode reset voltage VAR. At the end of the second period I2, the voltage of the first capacitor C1 is Vth, and the voltage of the second capacitor C2 is zero.

Figure 13:
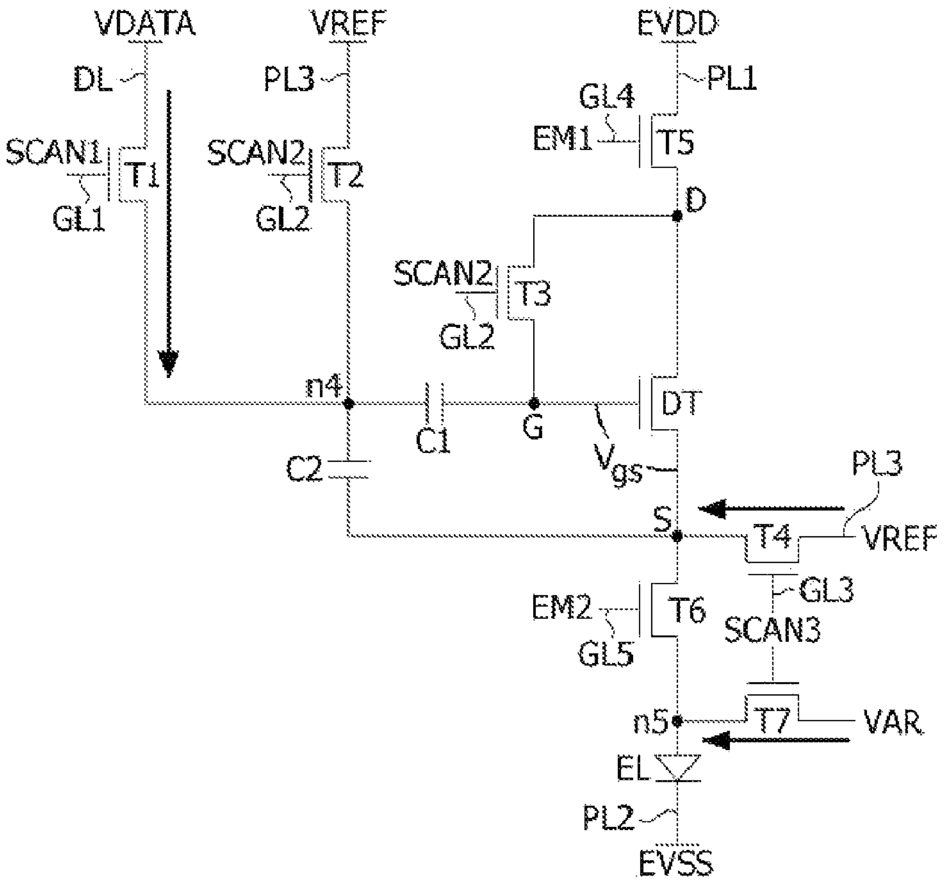

FIG. 13 is a circuit diagram illustrating a current flowing through the pixel circuit shown in FIG. 9 during the third period I3.

Referring to FIGS. 10, 11, and 13, during the third period I3, the data voltage VDATA of the pixel data is stored in the second capacitor C2. During the third period I3, the voltage of the first and third gate signals SCAN1 and SCAN3 is the gate-on voltage VGH, and the voltage of the second, fourth, and fifth gate signals SCAN2, EM1, and EM2 is the gate-on voltage VGH. During the third period I3, the first, fourth, and seventh switch elements T1, T4, and T7 are turned on, and the second, third, fifth, and sixth switch elements T2, T3, T5, and T6 are turned off. During the third period I3, the data voltage VDATA is applied to the node n4 and the reference voltage VREF is applied to the third node S. During the third period I3, the node reset voltage VAR is applied to the fifth node n5. Therefore, at the end of the third period I3, the voltage of the second node G is VDATA−Vth and the voltage of the third node S is VREF. At the end of the third period I3, the anode voltage of the light emitting element EL is the anode reset voltage VAR. At the end of the third period I3, the voltage of the second capacitor C2 is VDATA−VREF, and the voltage of the first capacitor C1 is Vth. At the end of the third period I3, the gate-source voltage Vgs of the driving element DT is VDATA−VREF+Vth.

Figure 14:
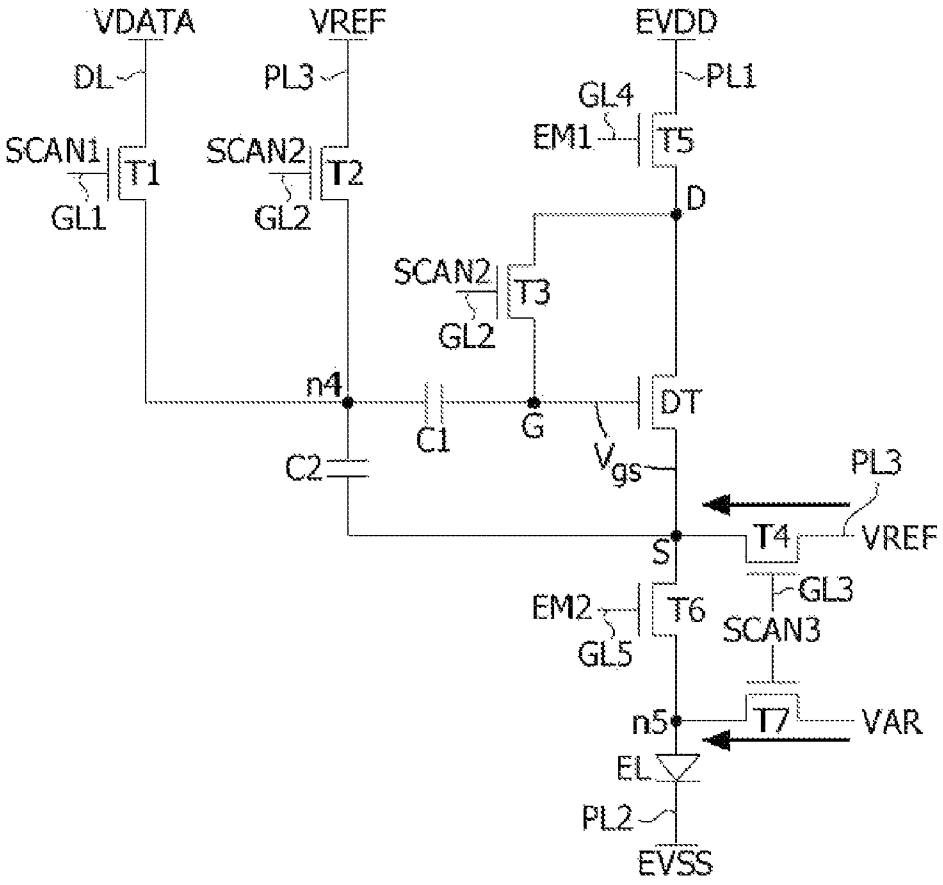

FIG. 14 is a circuit diagram illustrating a current flowing through the pixel circuit shown in FIG. 9 during the fourth period I4.

Referring to FIGS. 10, 11, and 14, during the fourth period I4, the voltage of the third gate signal SCAN3 is the gate-on voltage VGH, and the voltage of the first, second, fourth, and fifth gate signals SCAN1, SCAN2, EM1, and EM2 is the gate-off voltage VGL. During the fourth period I4, the fourth and seventh switch elements T4 and T7 are turned on, and the first, second, third, fifth, and sixth switch elements T1, T2, T3, T5, and T6 are turned off. During the fourth period I4, the reference voltage VREF is applied to the third node S and the anode reset voltage VAR is applied to the anode electrode of the light emitting element EL. At this time, since the second node G and the fourth node n4 are floating, the gate-source voltage of the driving element DT is maintained at VDATA−VREF+Vth, and the voltage of the capacitors C1 and C2 is also maintained.

During the fifth period i5, the current flowing through the pixel circuit illustrated in FIG. 9 is substantially the same as in FIG. 8A.

Figure 15:
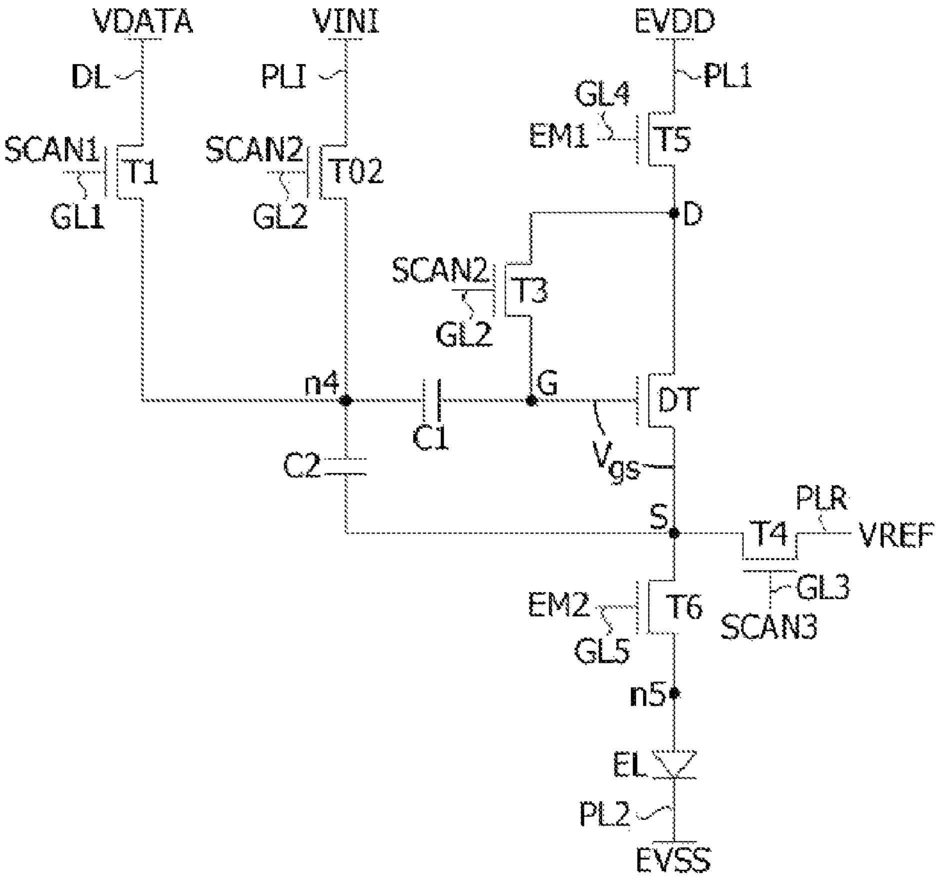
FIG. 15 is a circuit diagram illustrating a pixel circuit according to a third embodiment of the present disclosure.

FIG. 15 is a circuit diagram illustrating a pixel circuit according to a third embodiment of the present disclosure. This pixel circuit may receive the gate signals shown in FIG. 2 or FIG. 3 as input. In this embodiment, the initialization voltage VINI applied to the fourth node n4 may be set to a voltage independent of the reference voltage VREF, whereby the voltage of the reference voltage VREF may be optimized to a different voltage between the high-speed driving mode and the low-speed driving mode, and the reference voltage VREF may be varied in conjunction with the luminance of the pixels in the low-speed operation mode. In this embodiment, the components that are substantially the same as those of the first embodiment described above are designated by the same reference numerals, and a detailed description thereof is omitted.

Referring to FIGS. 2, 3, and 15, a second switch element T02 is turned on in response to the gate-on voltage VGH of the second gate signal SCAN2 during the first and second periods I1 and I2. When the second switch element T02 is turned on, the initialization voltage VINI is applied to the fourth node n4. The second switch element T02 is turned off during the third to fifth periods I3 to I5. The second switch element T02 includes a first electrode connected to an initialization voltage node PLI to which the initialization voltage VINI is applied, a gate electrode connected to a second gate line GL2 to which the second gate signal SCAN2 is applied, and a second electrode connected to a fourth node n4.

A fourth switch element T4 is turned on in response to the gate-on voltage VGH of the third gate signal SCAN3 during the second to fourth periods I2, I3, and I4. The fourth switch element T4 includes a first electrode connected to a third node S, a gate electrode connected to a third gate line GL3 to which the third gate signal SCAN3 is applied, and a second electrode connected to a reference voltage node PLR to which the reference voltage VREF is applied.

Figure 16:
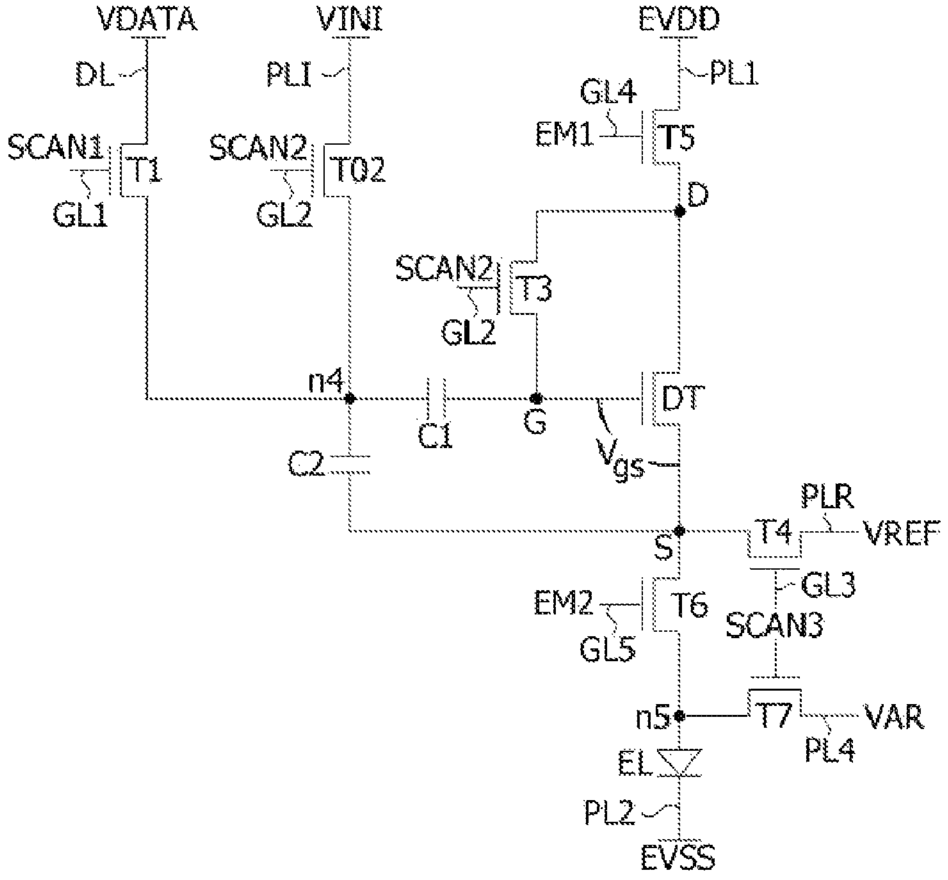
FIG. 16 is a circuit diagram illustrating a pixel circuit according to a fourth embodiment of this disclosure.

FIG. 16 is a circuit diagram illustrating a pixel circuit according to a fourth embodiment of this disclosure. This pixel circuit may receive the gate signals shown in FIG. 10 or FIG. 11 as input. In this embodiment, the initialization voltage VINI applied to a fourth node n4 may be set to a voltage independent of the reference voltage VREF, whereby the voltage of the reference voltage VREF may be varied between the high-speed driving mode and the low-speed driving mode. In this embodiment, the components that are substantially the same as those of the second and third embodiment described above are designated by the same reference numerals, and a detailed description thereof is omitted.

Referring to FIGS. 10, 11, and 16, a second switch element T02 is turned on in response to the gate-on voltage VGH of the second gate signal SCAN2 during the first and second periods I1 and I2. A fourth switch element T4 is turned on in response to the gate-on voltage VGH of the third gate signal SCAN3 during the second to fourth periods I2, I3, and I4.

Figure 17:
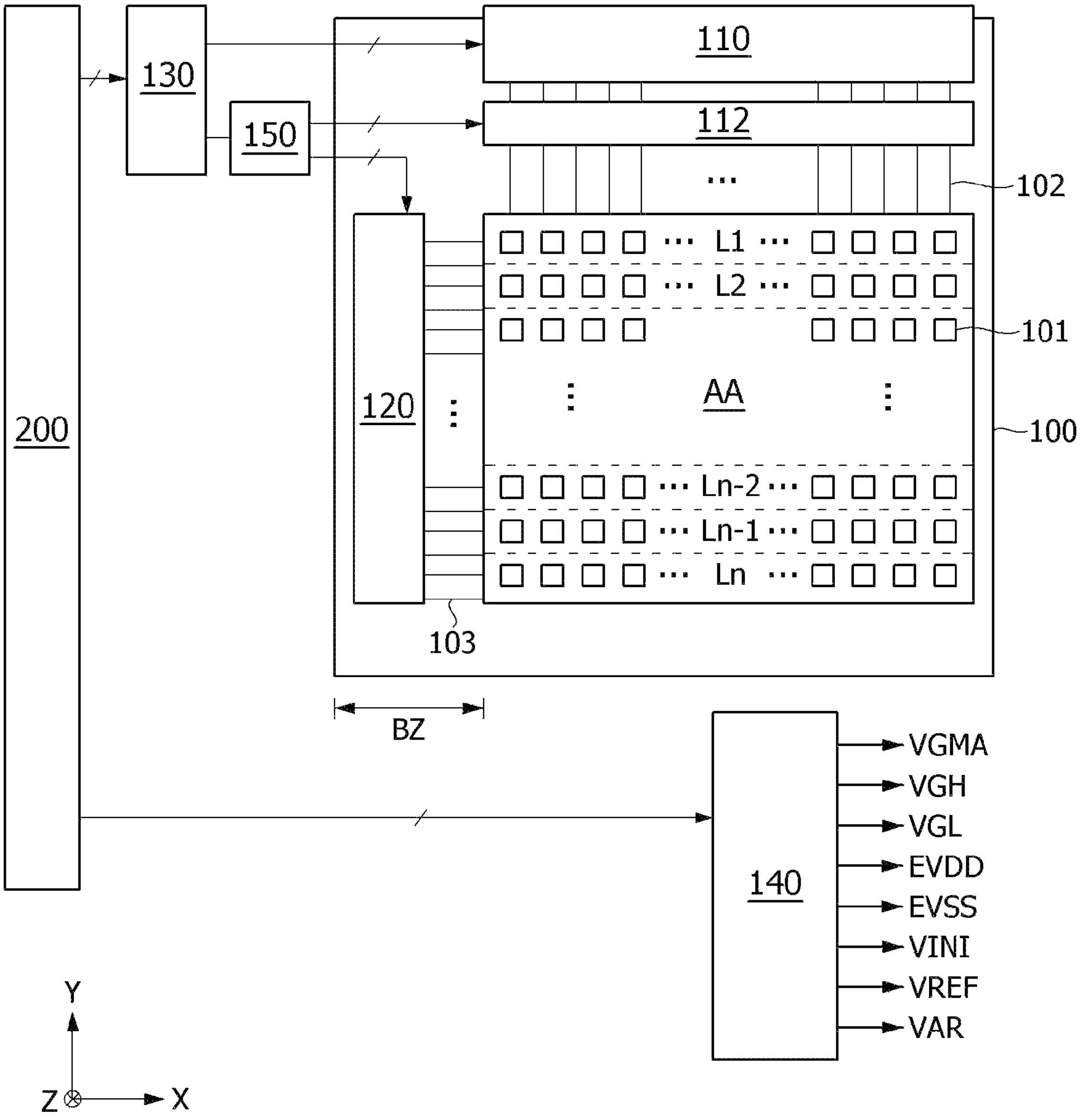
FIG. 17 is a block diagram illustrating a display device according to one embodiment of the present disclosure.
Figure 18:
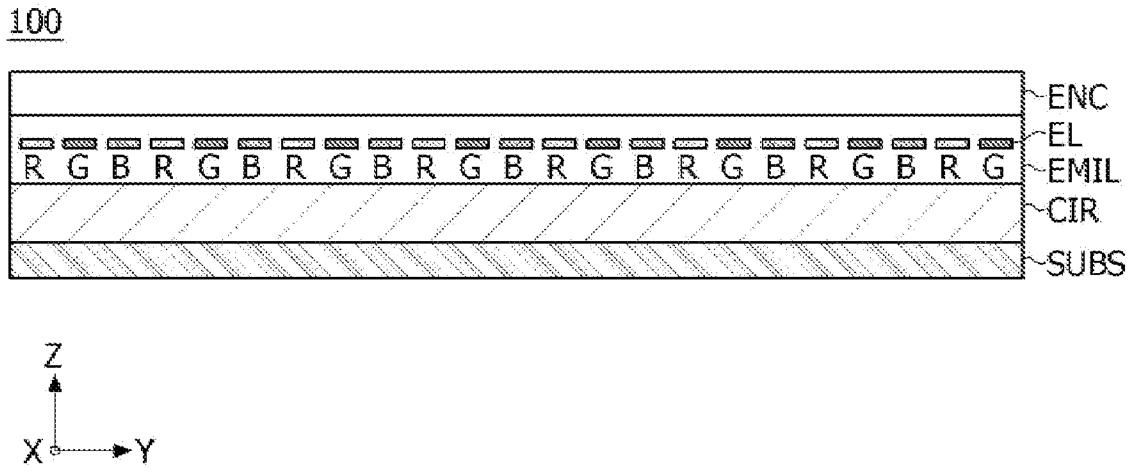
FIG. 18 is a cross-sectional view illustrating a cross-sectional structure of the display panel shown in FIG. 17.

FIG. 17 is a block diagram illustrating a display device according to one embodiment of the present disclosure. FIG. 18 is a cross-sectional view illustrating a cross-sectional structure of the display panel shown in FIG. 17.

Referring to FIGS. 17 to 18, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 may be a panel having a rectangular structure with a length in the X-axis direction, a width in the Y-axis direction, and a thickness in the Z-axis direction. A display area of the display panel 100 includes a pixel array for displaying an input image thereon. The pixel array includes a plurality of data lines 102, a plurality of gate lines 103 intersected with the data lines 102, and pixels arranged in a matrix form. The display panel 100 may further include power lines commonly connected to the pixels. The power lines are connected to constant voltage nodes of the pixel circuits and supply a constant voltage necessary for driving the pixels 101 to the pixels 101.

Each of the pixels 101 may be divided into a red sub-pixel, a green sub-pixel, and a blue sub-pixel for color implementation. Each of the pixels may further include a white sub-pixel. Each of the sub-pixels may be implemented with any of the pixel circuits described above. Each of the pixel circuits is connected to the data lines, the gate lines, and the power lines.

The pixels may be arranged as real color pixels and pentile pixels. A pentile pixel may realize a higher resolution than the real color pixel by driving two sub-pixels having different colors as one pixel 101 through the use of a preset pixel rendering algorithm. The pixel rendering algorithm may compensate for insufficient color representation in each pixel with the color of light emitted from an adjacent pixel.

The pixel array includes a plurality of pixel lines L1 to Ln. Each of the pixel lines L1 to Ln includes one line of pixels arranged along a line direction (X-axis direction) in the pixel array of the display panel 100. Pixels arranged in one pixel line share the gate lines 103. Sub-pixels arranged in a column direction Y along the data line direction share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on a screen and an actual object in the background is visible. The display panel 100 may be manufactured as a flexible display panel.

The cross-sectional structure of the display panel 100 may include a circuit layer CIR, a light emitting element layer EMIL, and an encapsulation layer ENC that are stacked on a substrate SUBS, as shown in FIG. 18.

The circuit layer CIR may include a thin-film transistor (TFT) array including a pixel circuit connected to wirings such as a data line, a gate line, a power line, and the like, a de-multiplexer array 112, and a gate driver 120. The circuit layer CIR includes a plurality of metal layers insulated with insulating layers interposed therebetween, and a semiconductor material layer. All transistors formed in the circuit layer CIR may be implemented as an n-channel oxide TFT.

The light emitting element layer EMIL may include a light emitting element EL driven by the pixel circuit. The light emitting element EL may include a light emitting element of a red sub-pixel, a light emitting element of a green sub-pixel, and a light emitting element of a blue sub-pixel. The light emitting element layer EMIL may further include a light emitting element of white sub-pixel. The light emitting element layer EMIL in each of the sub-pixels may have a structure in which the light emitting element and a color filter are stacked. The light emitting elements EL in the light emitting element layer EMIL may be covered by multiple protective layers including an organic film and an inorganic film.

The encapsulation layer ENC covers the light emitting element layer EMIL to seal the circuit layer CIR and the light emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light emitting element layer EMIL may be effectively blocked.

A touch sensor layer, not shown, may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may include metal wiring patterns and insulating films forming the capacitance of the touch sensors. The insulating films may insulate a portion where the metal wiring patterns are intersected, and may planarize the surface of the touch sensor layer. The polarizing plate may improve visibility and contrast ratio by converting the polarization of external light reflected by metal of the touch sensor layer and the circuit layer. The polarizing plate may be implemented as a polarizer or a circular polarizer to which a linear polarizer and a phase retardation film are bonded. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The power supply 140 generates a DC voltage (or a constant voltage) necessary for driving the pixel array of the display panel 100 and the display panel driving circuit. The DC-DC converter may include a charge pump, a regulator, a buck converter, a boost converter, and the like. The power supply 140 may adjust the level of a DC input voltage applied from the host system 200 to generate constant voltages such as a gamma reference voltage VGMA, a gate-on voltage VGH, a gate-off voltage VGL, a pixel driving voltage EVDD, a cathode voltage EVSS, an initialization voltage VINI, a reference voltage VREF, an anode reset VAR, and the like. The gamma reference voltage VGMA is supplied to a data driver 110. The gate-on voltage VGH and the gate-off voltage VGL are supplied to the gate driver 120. The constant voltages such as the pixel driving voltage EVDD, the cathode voltage EVSS, the initialization VINI, and the reference voltage VREF, the anode reset voltage VAR, and the like are supplied to the pixels 101 via the power lines commonly connected to the pixels 101.

The display panel driving circuit writes pixel data of an input image to the pixels of the display panel 100 under the control of the timing controller 130.

The display panel driving circuit includes the data driver 110 and the gate driver 120. The display panel driving circuit may further include a de-multiplexer array 112 disposed between the data driver 110 and the data lines 102.

The de-multiplexer array 112 sequentially supplies the data voltages outputted from channels of the data driver 110 to the data lines 102 using a plurality of de-multiplexers DEMUX. A de-multiplexer may include a multiple of switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driving circuit may further include a touch sensor driver for driving touch sensors. The touch sensor driver is omitted from FIG. 17. The data driver 110 and the touch sensor driver may be integrated into one drive IC (Integrated Circuit). In mobile devices or wearable devices, the timing controller 130, the power supply 140, the data driver 110, and the like may be integrated into one drive IC.

The display panel driving circuit may operate in a low-speed driving mode under the control of the timing controller 130. The low-speed driving mode may be set to reduce power consumption of the display device when an input image does not change during a predetermined number of frames as a result of analyzing the input image. In the low-speed driving mode, the power consumption in the display panel driving circuit and the display panel 100 may be reduced by lowering a frame frequency at which the pixel data is written to the pixels, that is, a refresh rate, when still images are inputted for a predetermined time or longer. The low-speed driving mode is not limited to a case where the still image is inputted. For example, when the display device operates in a standby mode or when a user command or an input image is not inputted to the display panel driving circuit for a predetermined time or longer, the display panel driving circuit may operate in the low-speed driving mode.

The data driver 110 receives pixel data of the input image received as a digital signal from the timing controller 130 and outputs a data voltage. The data driver 110 converts the pixel data of the input image into a gamma compensated voltage at each frame period in a normal driving mode using a digital-to-analogue converter (DAC) and outputs the data voltage VDATA. The data driver 110 converts the pixel data of the input image into the gamma compensated voltage to output the data voltage VDATA using the DAC only in a refresh frame in the low-speed driving mode, and stops its operation in the hold frame to not output the data voltage. In the low-speed driving mode, the pixels 101 charge a pixel data voltage in the refresh frame and maintain a previous data voltage in a hold frame.

The gamma reference voltage VGMA is divided by a voltage divider circuit into the gamma compensated voltage for each gray scale. The gamma compensated voltage for each gray scale is provided to the DAC in the data driver 110. The data voltage VDATA is outputted through an output buffer in each of the channels of the data driver 110.

The gate driver 120 may be implemented as a gate in panel (GIP) circuit formed in the circuit layer CIR on the display panel 100 together with the TFT array of the pixel array and wirings. The gate driver 120 may be disposed on a bezel area BZ, which is non-display area of the display panel 100, or may be distributedly disposed in a pixel array in which an input image is reproduced.

The gate driver 120 may be disposed in the bezel BZ on opposite sides of the display panel 100 with the display area of the display panel interposed therebetween and may supply gate pulses from the opposite sides of the gate lines 103 in a double feeding method. The gate driver 120 sequentially outputs pulses of the gate signals to the gate lines 103 under the control of the timing controller 130. The gate driver 120 may sequentially supply the gate signals to the gate lines 103 by shifting the gate signals using a shift register.

The gate driver 120 may include a first shift register that sequentially outputs the first gate signal SCAN1 and a second shift register that sequentially outputs the second gate signal SCAN2, a third shift register that sequentially outputs the third gate signal SCAN3, a fourth shift register that sequentially outputs the fourth gate signal EM1, and a fifth shift register that sequentially outputs the fifth gate signal EM2.

The timing controller 130 receives digital video data DATA of the input image, a timing signal synchronized therewith, and refresh rate information from the host system 200. The timing signal may include a vertical synchronization signal Vsync, a horizontal synchronization signal Hsync, a clock CLK, and a data enable signal DE. Because a vertical period and a horizontal period may be known by counting the data enable signal DE, the vertical synchronization signal Vsync and the horizontal synchronization signal Hsync may be omitted. The data enable signal DE has a cycle of one horizontal period (1H).

The host system 200 may be any one of a television (TV) system, a tablet computer, a notebook computer, a navigation system, a personal computer (PC), a home theater system, a mobile device, a wearable device, and a vehicle system. The host system may scale an image signal from a video source to match the resolution of the display panel 100, and may transmit it to the timing controller 130.

The timing controller 130 may multiply the input frame frequency by i (i is a natural number) in a normal driving mode, so that it can control the operation timing of the display panel driving circuit at a frame frequency of the input frame frequency×i Hz. The input frame frequency is 60 Hz in a national television standards committee (NTSC) system and 50 Hz in a phase-alternating line (PAL) system.

The host system 200 or the timing controller 130 may vary the refresh rate or the frame frequency to match the motion or content characteristics of the input image, or may vary the refresh rate or the frame frequency based on the content of the input image.

The timing controller 130 reduces a frequency of a frame rate at which the pixel data is written to the pixels in the low-speed driving mode, compared to the normal driving mode. For example, the frame frequency at which the pixel data is written to the pixels in the normal driving mode may be a frequency of 60 Hz or higher, e.g., any one of 60 Hz, 120 Hz, 144 Hz or 240 Hz, and the frame frequency in the low-speed driving mode may be a frequency lower than that in the normal driving mode. The timing controller 130 may reduce the driving frequency for the display panel driving circuit by reducing the frame frequency to lower the refresh rate of the pixels in the low-speed driving mode.

The timing controller 130 generates a data timing control signal for controlling the operation timing of the data driver 110, a control signal for controlling the operation timing of the de-multiplexer array 112, and a gate timing control signal for controlling the operation timing of the gate driver 120, based on the timing signals received from the host system 200. The timing controller 130 synchronizes the data driver 110, the de-multiplexer array 112, the touch sensor driver, and the gate driver 120 by controlling the operation timings of the display panel driving circuit.

A MUX control signal and a gate timing control signal outputted from timing controller 130 may be inputted to the de-multiplexer array 112 and the gate driver 120 through a level shifter 150. The level shifter 150 may receive the gate timing control signal to generate a start pulse and a shift clock. The signal outputted from the level shifter 150 swings between the gate-on voltage VGH and the gate-off voltage VGL.

The technical benefits and improvements of the present disclosure, the means for achieving the same, and advantages and effects of the present disclosure described above do not specify features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pixel circuit comprising:

a driving element including a first electrode connected to a first node, a gate electrode connected to a second node, and a second electrode connected to a third node;

a first capacitor connected between the second node and a fourth node;

a second capacitor connected between the third node and the fourth node;

a first switch element configured to be turned on in response to a first gate signal to supply a data voltage of pixel data to the fourth node;

a second switch element configured to be turned on in response to a second gate signal to supply a reference voltage or an initialization voltage to the fourth node;

a third switch element configured to be turned on in response to the second gate signal to electrically connect the first node to the second node;

a fourth switch element configured to be turned on in response to a third gate signal to supply the reference voltage to the third node;

a fifth switch element configured to be turned on in response to a fourth gate signal to supply a pixel driving voltage to the first node;

a sixth switch element configured to be turned on in response to a fifth gate signal to electrically connect the third node to a fifth node; and a light emitting element including an anode electrode connected to the fifth node and a cathode electrode connected to a cathode voltage.

2. The pixel circuit of claim 1, wherein in operation, after a threshold voltage of the driving element is stored in the first capacitor, the data voltage is stored in the second capacitor.

3. The pixel circuit of claim 1, wherein a driving period of the pixel circuit includes a first period, a second period, a third period, a fourth period, and a fifth period;

a voltage of the first gate signal is at a gate-on level synchronized with the data voltage during the third period and is at a gate-off level during the first, second, fourth, and fifth periods;

a voltage of the second gate signal is at a gate-on level during the first and second periods and at a gate-off level during the third, fourth, and fifth periods;

a voltage of the third gate signal is at a gate-on level during the second, third, and fourth periods and at a gate-off level during the first and fifth periods;

a voltage of the fourth gate signal is at a gate-on level during the first and fifth periods and at a gate-off level during the second, third, and fourth periods; and a voltage of the fifth gate signal is at a gate-on level during the fourth and fifth periods and at a gate-off level during the first, second, and third periods.

4. The pixel circuit of claim 3, wherein in operation the voltage of the third gate signal is inverted to the gate-on level after a first delay time has elapsed after the voltage of the fourth gate signal has been inverted to the gate-off level; and the voltage of the fourth gate signal is inverted to the gate-on level after a second delay time has elapsed after the voltage of the third gate signal has been inverted to the gate-off level.

5. The pixel circuit of claim 4, wherein in operation the voltage of the first gate signal is inverted to the gate-on level after a third delay time has elapsed after the voltage of the second gate signal has been inverted to the gate-off level; and the voltage of the fifth gate signal is inverted to the gate-on level after a fourth delay time has elapsed after the voltage of the first gate signal has been inverted to the gate-off voltage.

6. The pixel circuit of claim 1, further comprising:

a seventh switch element configured to be turned on in response to the third gate signal to apply an anode reset voltage to the fifth node.

7. The pixel circuit of claim 6, wherein a driving period of the pixel circuit includes a first period, a second period, a third period, a fourth period, and a fifth period;

a voltage of the first gate signal is at a gate-on voltage synchronized with the data voltage during the third period and is at a gate-off level during the first, second, fourth, and fifth periods;

a voltage of the second gate signal is at a gate-on level during the first and second periods and at a gate-off level during the third, fourth, and fifth periods;

a voltage of the third gate signal is at a gate-on level during the second, third, and fourth periods and at a gate-off level during the first and fifth periods;

a voltage of the fourth gate signal is at a gate-on level during the first and fifth periods and at a gate-off level during the second, third, and fourth periods; and a voltage of the fifth gate signal is at a gate-on level during the fifth period and at a gate-off level during the first, second, third, and fourth periods.

8. The pixel circuit of claim 7, wherein the voltage of the third gate signal is inverted to the gate-on level after a first delay time has elapsed after the voltage of the fourth gate signal has been inverted to the gate-off level;

the voltage of the fourth gate signal is inverted to the gate-on level after a second delay time has elapsed after the voltage of the third gate signal has been inverted to the gate-off level; and the voltage of the fifth gate signal is inverted to the gate-on level between a falling edge of the third gate signal and a rising edge of the fourth gate signal within the second delay time.

9. A display device comprising:

a display panel in which a plurality of data lines, a plurality of gate lines, a plurality of power lines, and a plurality of pixel circuits are disposed;

a data driver configured to output data voltages of pixel data to the data lines; and a gate driver configured to supply gate signals to gate lines, wherein each of the pixel circuits includes:

a driving element including a first electrode connected to a first node, a gate electrode connected to a second node, and a second electrode connected to a third node;

a first capacitor connected between the second node and a fourth node;

a second capacitor connected between the third node and the fourth node;

a first switch element configured to be turned on in response to a gate-on voltage of a first gate signal to supply a data voltage of pixel data to the fourth node;

a second switch element configured to be turned on in response to a second gate signal to supply a reference voltage or an initialization voltage to the fourth node;

a third switch element configured to be turned on in response to the second gate signal to electrically connect the first node to the second node;

a fourth switch element configured to be turned on in response to a third gate signal to supply the reference voltage to the third node;

a fifth switch element configured to be turned on in response to a fourth gate signal to supply a pixel driving voltage to the first node;

a sixth switch element configured to be turned on in response to a fifth gate signal to electrically connect the third node to a fifth node; and a light emitting element including an anode electrode connected to the fifth node, and a cathode electrode connected to a cathode voltage.

10. The display device of claim 9, wherein each of the pixel circuits further includes:

a seventh switch element configured to be turned on in response to the gate-on voltage of the third gate signal to apply an anode reset voltage to the fifth node.

11. The display device of claim 9, wherein in operation, after a threshold voltage of the driving element is stored in the first capacitor, the data voltage is stored in the second capacitor.

12. The display device of claim 9, wherein a driving period of the pixel circuit includes a first period, a second period, a third period, a fourth period, and a fifth period;

a voltage of the first gate signal is at a gate-on level synchronized with the data voltage during the third period and is at a gate-off level during the first, second, fourth, and fifth periods;

a voltage of the second gate signal is at a gate-on level during the first and second periods and at a gate-off level during the third, fourth, and fifth periods;

a voltage of the third gate signal is at a gate-on level during the second, third, and fourth periods and at a gate-off level during the first and fifth periods;

a voltage of the fourth gate signal is at a gate-on level during the first and fifth periods and at a gate-off level during the second, third, and fourth periods; and a voltage of the fifth gate signal is at a gate-on level during the fourth and fifth periods and at a gate-off level during the first, second, and third periods.

13. The display device of claim 12, wherein in operation the voltage of the third gate signal is inverted to the gate-on level after a first delay time has elapsed after the voltage of the fourth gate signal has been inverted to the gate-off level; and the voltage of the fourth gate signal is inverted to the gate-on level after a second delay time has elapsed after the voltage of the third gate signal has been inverted to the gate-off level.

14. The display device of claim 13, wherein in operation the voltage of the first gate signal is inverted to the gate-on level after a third delay time has elapsed after the voltage of the second gate signal has been inverted to the gate-off level; and the voltage of the fifth gate signal is inverted to the gate-on level after a fourth delay time has elapsed after the voltage of the first gate signal has been inverted to the gate-off voltage.

15. The display device of claim 10, wherein a driving period of the pixel circuit includes a first period, a second period, a third period, a fourth period, and a fifth period;

a voltage of the first gate signal is at a gate-on voltage synchronized with the data voltage during the third period and is at a gate-off level during the first, second, fourth, and fifth periods;

a voltage of the second gate signal is at a gate-on level during the first and second periods and at a gate-off level during the third, fourth, and fifth periods;

a voltage of the third gate signal is at a gate-on level during the second, third, and fourth periods and at a gate-off level during the first and fifth periods;

a voltage of the fourth gate signal is at a gate-on level during the first and fifth periods and at a gate-off level during the second, third, and fourth periods; and a voltage of the fifth gate signal is at a gate-on level during the fifth period and at a gate-off level during the first, second, third, and fourth periods.

16. The display device of claim 15, wherein the voltage of the third gate signal is inverted to the gate-on level after a first delay time has elapsed after the voltage of the fourth gate signal has been inverted to the gate-off level;

the voltage of the fourth gate signal is inverted to the gate-on level after a second delay time has elapsed after the voltage of the third gate signal has been inverted to the gate-off level; and the voltage of the fifth gate signal is inverted to the gate-on level between a falling edge of the third gate signal and a rising edge of the fourth gate signal within the second delay time.

* * * * *